(12) United States Patent
Swanson et al.

(10) Patent No.: US 11,745,824 B2
(45) Date of Patent: Sep. 5, 2023

(54) CONTROL DEVICE FOR A BICYCLE

(71) Applicant: SRAM, LLC, Chicago, IL (US)

(72) Inventors: Neil Swanson, Colorado Springs, CO (US); Doug Mahoney, Park Ridge, IL (US); Ryan Grimm, Littleton, CO (US)

(73) Assignee: SRAM, LLC, Chicago, IL (US)

( * ) Notice: Subject to any disclaimer, the term of this patent is extended or adjusted under 35 U.S.C. 154(b) by 72 days.

(21) Appl. No.: 17/091,624

(22) Filed: Nov. 6, 2020

(65) Prior Publication Data

US 2022/0144378 A1 May 12, 2022

(51) Int. Cl.
*B62L 3/02* (2006.01)
*B62K 21/12* (2006.01)
*B62M 25/08* (2006.01)

(52) U.S. Cl.
CPC .............. *B62L 3/023* (2013.01); *B62K 21/12* (2013.01); *B62M 25/08* (2013.01)

(58) Field of Classification Search
CPC ........ B62L 3/023; B62M 25/08; B62K 21/12; B62K 23/06; B62J 43/20; F15B 7/08
See application file for complete search history.

(56) References Cited

U.S. PATENT DOCUMENTS

| | | | |
|---|---|---|---|
| 9,809,274 | B2 | 11/2017 | Dunlap et al. |
| 10,589,819 | B2 | 3/2020 | Komada et al. |
| 2015/0090550 | A1 | 4/2015 | Matsueda |
| 2016/0129966 | A1* | 5/2016 | Meggiolan ............. B62K 23/02 74/491 |
| 2016/0129968 | A1* | 5/2016 | Meggiolan ............. B62L 3/023 188/344 |
| 2016/0200390 | A1* | 7/2016 | Carrasco Vergara .. B62K 23/06 60/594 |
| 2016/0264213 | A1* | 9/2016 | Swanson ................ B62M 25/08 |

(Continued)

FOREIGN PATENT DOCUMENTS

| | | |
|---|---|---|
| CN | 102139735 | 8/2011 |
| CN | 105584575 | 5/2016 |

(Continued)

OTHER PUBLICATIONS

Is nylon a trademark, Microsoft Bing, Jul. 24, 2022 (Year: 2022).*

(Continued)

*Primary Examiner* — Vinh Luong

(57) ABSTRACT

A control device mountable to a handlebar of a bicycle includes a housing, a lever coupled to and pivotable relative to the housing, and a master cylinder portion supported by the housing. The master cylinder portion has a fluid cylinder. The fluid cylinder has a first end and a second end opposite the first end with a cylindrical wall therebetween. An opening extends through the master cylinder portion, from the first end to the second end. The control device also includes a plug removably connected to the master cylinder portion via the opening at the first end of the fluid cylinder, and a piston assembly supported by the housing. The piston assembly is movable relative to the master cylinder portion. The housing is made of a first material, and the master cylinder portion is made of a second material. The second material is different than the first material.

14 Claims, 17 Drawing Sheets

(56) References Cited

U.S. PATENT DOCUMENTS

| | | | |
|---|---|---|---|
| 2018/0015982 A1 | 1/2018 | Matsueda | |
| 2018/0141612 A1 | 5/2018 | Nobukatsu | |
| 2019/0106177 A1 | 4/2019 | Swanson et al. | |
| 2019/0210691 A1* | 7/2019 | Cahan | B62L 3/023 |
| 2019/0315424 A1 | 10/2019 | Nishino | |
| 2020/0172193 A1* | 6/2020 | Zenere | B62L 1/06 |
| 2020/0407011 A1* | 12/2020 | Luman | B62L 3/023 |
| 2021/0078671 A1* | 3/2021 | Su | B62L 3/023 |
| 2021/0139102 A1* | 5/2021 | Komada | B62L 3/026 |
| 2023/0067171 A1* | 3/2023 | Brown | B62K 23/02 |

FOREIGN PATENT DOCUMENTS

| | | |
|---|---|---|
| CN | 105966527 | 9/2016 |
| DE | 102018118460 | 10/2016 |
| EP | 3018049 | 5/2016 |
| GB | 1536353 | 12/1978 |
| TW | 201623080 | 7/2016 |
| TW | 201930141 | 8/2019 |

OTHER PUBLICATIONS

European Search Report in Application EP 21203158 dated Mar. 29, 2022 (Year: 2022).*
European Search Opinion in Application EP 21203158 dated Jul. 6, 2022 (Year: 2022).*

* cited by examiner

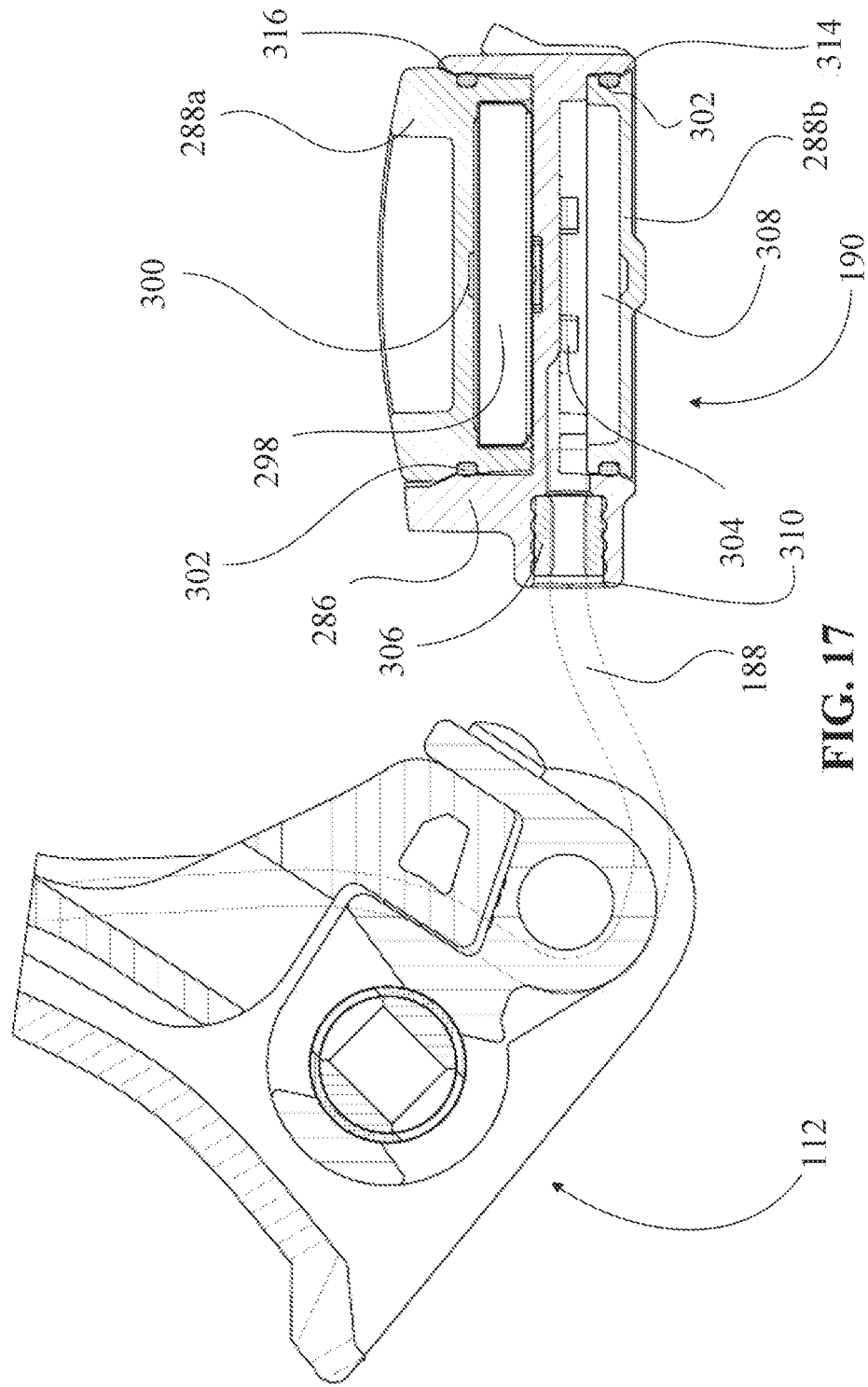

CONTROL DEVICE FOR A BICYCLE

BACKGROUND

1. Field of the Disclosure

The present disclosure is generally directed to a control device for a bicycle, and more particularly, to a control device for a bicycle braking mechanism and gear shifting mechanism.

2. Description of Related Art

Many vehicles, such as, for example, bicycles, utilize a hydraulic brake system that applies pressure to a rotating part, a rotating wheel, or a disc mounted to the rotating wheel. Some of these braking systems utilize a mechanism including a brake lever to generate pressure in a hydraulic fluid. This pressure is transferred through a hydraulic line or conduit to a brake assembly, such that the hydraulic pressure is applied to pads of the brake assembly to squeeze the pads against the rotating part to impart a braking force.

The mechanism including the hand lever may be part of a control device that also includes an electronic shift control system. The electronic shift control system also includes at least a shift lever located adjacent to the brake lever, a transmitter configured to wirelessly transmit shift signals wirelessly, and a battery unit configured to power the transmitter. The control device is mountable to a handlebar of the bicycle, such that a rider may activate the brake lever and the shift lever.

SUMMARY

In one example, a control device mountable to a handlebar of a bicycle includes a housing, a lever coupled to and pivotable relative to the housing, and a master cylinder portion supported by the housing. The master cylinder portion has a fluid cylinder. The fluid cylinder has a first end and a second end opposite the first end with a cylindrical wall therebetween. The fluid cylinder is hollow, such that an opening extends through the master cylinder portion, from the first end to the second end. The control device also includes a plug removably connected to the master cylinder portion via the opening at the first end of the fluid cylinder, and a piston assembly supported by the housing. The piston assembly is movable relative to the master cylinder portion. At least part of the piston assembly is disposed within the master cylinder portion. The housing is made of a first material, and the master cylinder portion is made of a second material. The second material is different than the first material.

In one example, the control device further includes a pull rod. The lever is coupled to the piston assembly via the pull rod, such that rotation of the lever relative to the housing causes the piston assembly to translate relative to the master cylinder portion.

In one example, the first material is a glass filled polyamide or a carbon filled polyamide, and the second material is aluminum.

In one example, the plug is a bleed plug, and the first opening is a bleed port.

In one example, the bleed plug has a central axis that extends along a length of the bleed plug. The central axis of the bleed plug extends through the opening through the master cylinder portion.

In one example, the central axis of the bleed plug is a first central axis. The master cylinder portion has a second central axis extending along a length of the master cylinder portion. The first central axis is in line with the second central axis.

In one example, the central axis of the bleed plug is a first central axis. The master cylinder portion has a second central axis extending along a length of the master cylinder portion. The first central axis is offset relative to the second central axis.

In one example, the piston assembly is biased against an inner surface of the fluid cylinder, such that the inner surface of the fluid cylinder acts as a stop and locates an initial position of the piston assembly relative to the master cylinder portion. The inner surface of the fluid cylinder is closer to the first end of the fluid cylinder than the second end of the fluid cylinder.

In one example, the cylindrical wall of the fluid cylinder has at least one inner annular surface and at least one outer annular surface. The cylindrical wall of the fluid cylinder includes a first opening extending from an inner annular surface of the at least one inner annular surface to an outer annular surface of the at least one outer annular surface of the cylindrical wall, through the cylindrical wall, and a second opening extending from the inner annular surface or another inner annular surface of the at least one inner annular surface to the outer annular surface or another outer annular surface of the at least one outer annular surface of the cylindrical wall, through the cylindrical wall. The first opening is positioned at a distance along a length of the master cylinder portion relative to the second opening.

In one example, the first opening is a timing port, and the second opening is a compensation port.

In one example, the piston assembly includes a piston that is a hollow and has a first end, a second end opposite the first end, an inner annular surface, an outer annular surface, and a flange extending around and away from the outer annular surface. The piston assembly also includes a piston cap connected to the first end of the piston, and a seal disposed around the piston and between the flange of the piston and the piston cap.

In one example, the seal is disposed adjacent to the first opening when the piston assembly is in the initial position relative to the master cylinder portion.

In one example, a fluid is disposable within a volume between the piston and the fluid cylinder. The piston assembly is configured to translate in a first direction relative to the master cylinder portion when the lever rotates in a first rotational direction relative to the housing, such that the seal moves towards the timing port and pushes a portion of the fluid out of the master cylinder portion for activation of a brake caliper of the bicycle.

In one example, the piston cap has a castled end.

In one example, the control device further includes a fluid port supported by the housing, and a fluid chamber within the housing. When the piston assembly is in the initial position relative to the master cylinder portion, the control device has a fluid path between the fluid port and the plug, via a volume between the master cylinder portion and the piston, the first opening through the cylindrical wall of the master cylinder portion, the fluid chamber, the second opening through the cylindrical wall of the master cylinder portion, and the piston cap.

In one example, the control device further includes a shift lever coupled to and movable relative to the housing, an electrical switch that is actuatable by movement of the shift lever, and a controller in communication with the electrical switch. The controller is configured to generate a shift signal in response to actuation of the electrical switch. The control device further includes a battery receptacle supported by the housing. The battery receptacle is electrically connected to the controller, such that when a battery is disposed within the battery receptacle, the battery is configured to power the controller, the electrical switch, the shift lever, or any combination thereof. The control device also includes one or more removable battery covers that cover and may close off the battery receptacle from an external environment.

In one example, the battery receptacle has one or more outer surfaces and includes one or more attachment features extending away from the one or more outer surfaces. The housing includes one or more recesses corresponding to the one or more attachment features, respectively. The one or more attachment features are engageable with the one or more recesses of the housing, respectively, such that the battery receptacle is retained within the housing.

In one example, the one or more outer surfaces include an outer annular surface, and the one or more recesses include a plurality of recesses. The one or more attachment features include a plurality of tabs extending away from the outer annular surface. The plurality of tabs are engageable with the plurality of recesses, respectively.

In one example, a brake control device for a bicycle includes a housing including a fluid chamber, a lever coupled to and pivotable relative to the housing, and a master cylinder portion supported by the housing. The master cylinder portion has a fluid cylinder. The fluid cylinder has a first end and a second end opposite the first end. The brake control device also includes a plug removably connected to the first end of the fluid cylinder. The fluid cylinder is accessible from outside the housing when the plug is removed from the fluid cylinder. The brake control device has a fluid path between the first end of the fluid cylinder and the second end of the fluid cylinder, via the fluid chamber of the housing.

In one example, the fluid cylinder has an opening extending radially through a portion of the fluid cylinder. The fluid path between the first end of the fluid cylinder and the second end of the fluid cylinder includes a fluid path between the fluid chamber and the second end of the fluid cylinder via the opening through the portion of the fluid cylinder.

In one example, the portion of the fluid cylinder is a first portion of the fluid cylinder, and the opening is a first opening. The fluid cylinder has a second opening extending radially through a second portion of the fluid cylinder. The first opening is positioned at a distance along a length of the fluid cylinder relative to the second opening. The fluid path between the first end of the fluid cylinder and the second end of the fluid cylinder includes a fluid path between the first end of the fluid cylinder and the fluid chamber via the second opening through the second portion of the fluid cylinder.

BRIEF DESCRIPTION OF THE DRAWINGS

Objects, features, and advantages of the present invention will become apparent upon reading the following description in conjunction with the drawing figures, in which:

FIG. 17 is a close-up cross-section of a portion of the shift lever assembly of FIG. 16 taken along axis XVI-XVI.

DETAILED DESCRIPTION OF THE DISCLOSURE

Figure 1:
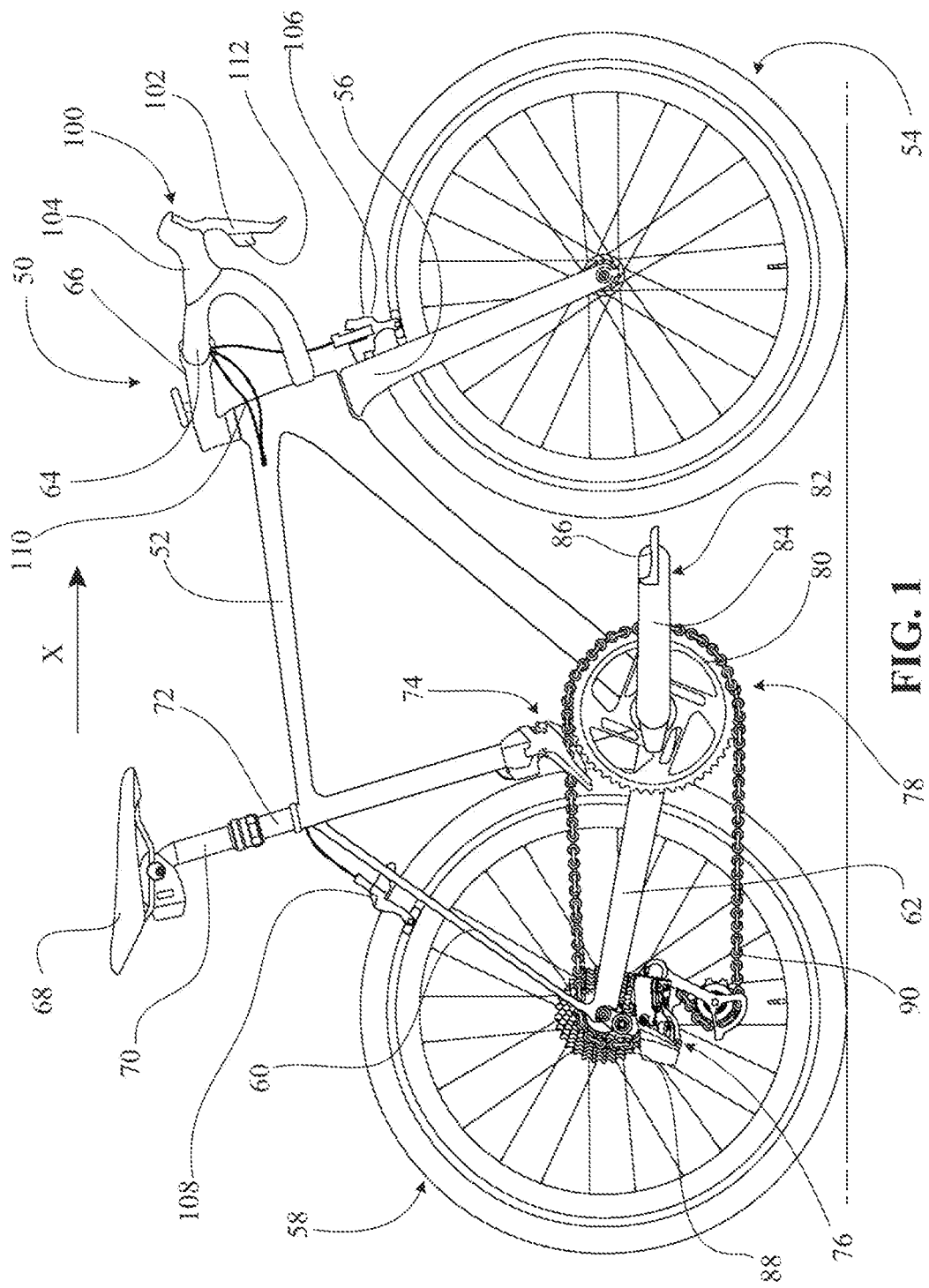
FIG. 1 is a side view of one example of a bicycle that may be fitted with a control device constructed in accordance with the teachings of this disclosure.

The present disclosure provides examples of control devices for a bicycle that solve or improve upon one or more disadvantages with prior known control devices. To create a lower cost configuration of a master cylinder and piston assembly, the master cylinder is independent of a lever body of the control device. This allows each component to be designed and manufactured using, for example, lowest cost and/or lowest weight materials for each component. To reduce the number of components for cost and/or assembly purposes, multiple components and/or functions are integrated together.

For example, a bleed port and a bleed screw are integrated into the master cylinder, which is an independent component of the lever body. The master cylinder also includes timing ports. The timing ports allow fluid to flow between a caliper of the brake assembly and a reservoir within the lever body of the control device. When a primary seal crosses the timing port, the seal positively displaces fluid and builds hydraulic pressure within the hydraulic line to a brake assembly. This hydraulic pressure causes the braking force, slowing the bicycle and the rider. For this reason, locating the primary seal close to the timing ports allows for minimum lever movement before braking is felt by the rider.

The disclosed control devices reduce a tolerance variation between the master cylinder and the primary seal compared to existing control devices. Existing control devices rely on a locating feature formed on the lever body, separate from the master cylinder, to locate the piston assembly relative to the master cylinder. A control device of the present disclosure stops and locates the piston assembly, which includes, for example, a master piston, the primary seal, a glide ring bushing, and a piston cap, on the master cylinder.

These and other objects, features, and advantages of the disclosed control devices will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 depicts a bicycle 50 with a frame 52, a front wheel 54 coupled to a fork 56 of the frame 52, and a rear wheel 58 coupled to seat stays 60 and chain stays 62 of the frame 52. The front wheel 54 and the rear wheel 58 support the frame 52 above a surface on which the bicycle 50 may travel in a forward direction indicated by the arrow 'X'. The bicycle 50 has a drop-bar type handlebar 64 that is mounted to a head tube 66 of the frame 52. The bicycle 50 also has a seat 68 carried by a seat post 70 received in a seat tube 72 of the frame 52. The bicycle 50 may have one or both of a front gear changer 74 (e.g., a front electromechanical derailleur; hereinafter, referred to as a front derailleur) and a rear gear changer 76 (e.g., a rear electromechanical derailleur; hereinafter, referred to as a rear derailleur) mounted to the frame 52. The bicycle 50 includes a multiple-geared drive train 78 with one or more chainrings 80 driven by a crank assembly 82, which has two crank arms 84 and two pedals 86, respectively. The chainrings 80 may be connected to a plurality of sprockets 88 at the rear wheel 58 by a chain 90.

Figure 2:
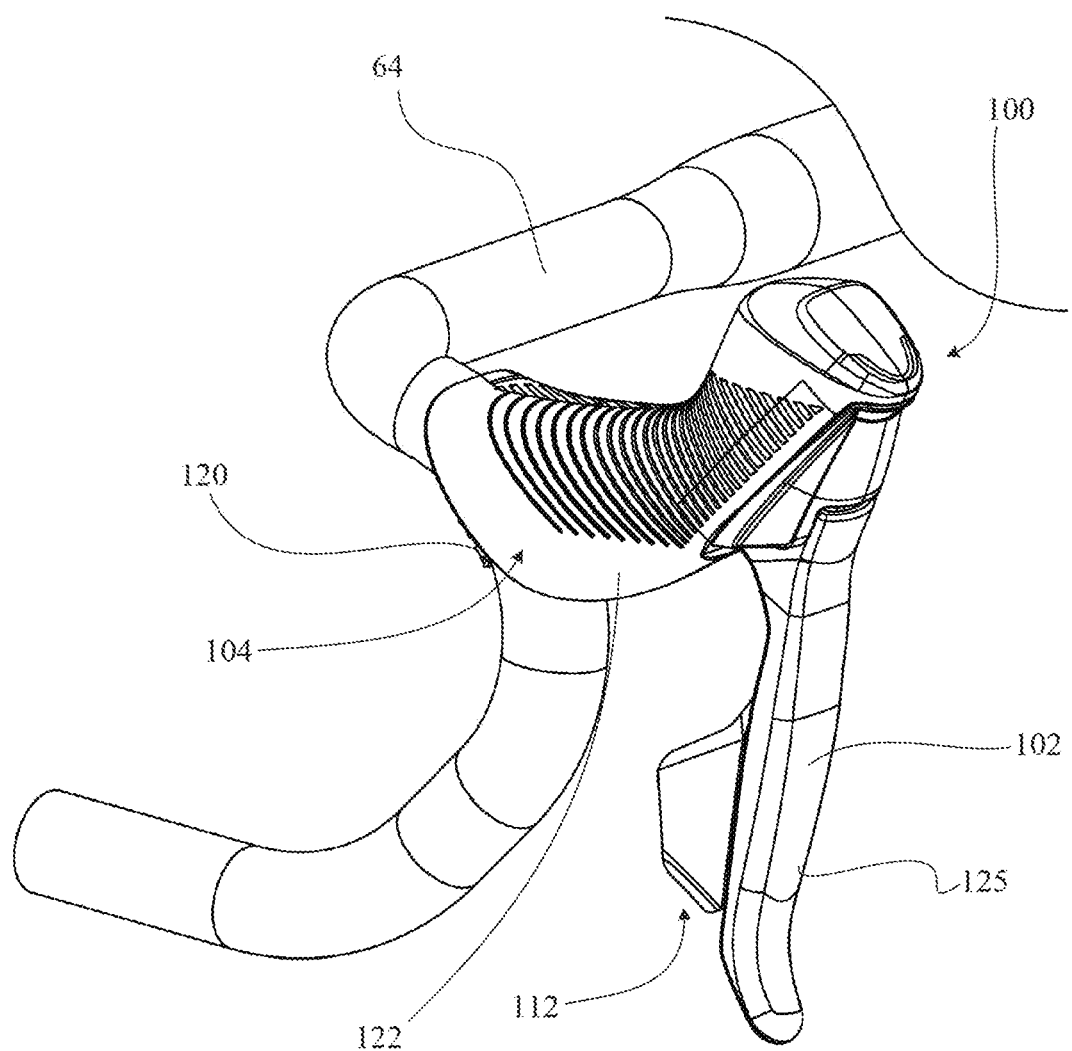
FIG. 2 is a first exterior perspective view of the control device and a portion of a handlebar of the bicycle of FIG. 1.
Figure 3:
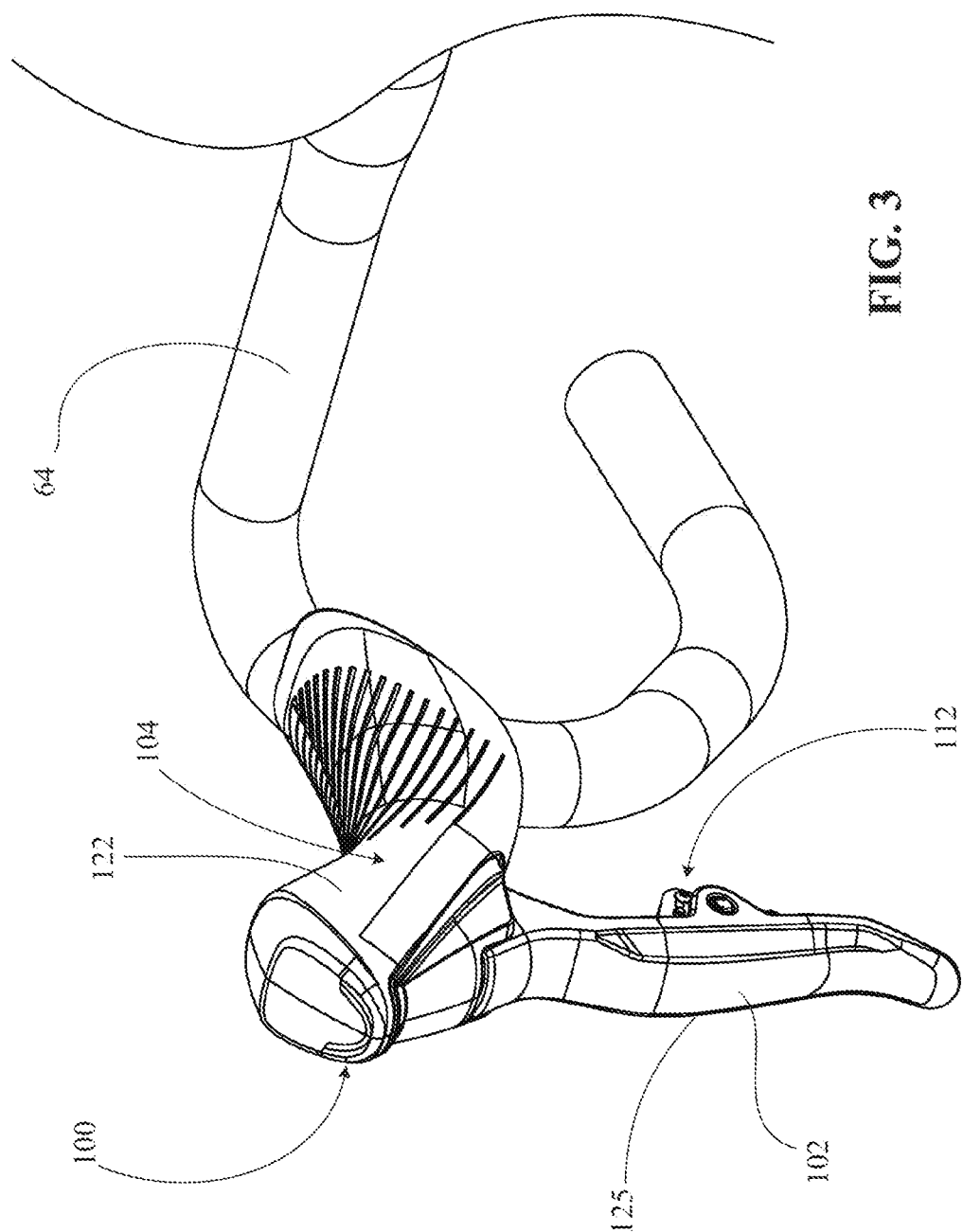
FIG. 3 is a second exterior perspective view of the control device and a portion of the handlebar of the bicycle of FIG. 1.

Referring to FIGS. 1-3, the bicycle 50 in the disclosed example has at least one bicycle control device 100 (e.g., control device 100) that is mountable to the handlebar 64. In this example, the control device 100 includes a brake control element of a brake system. The brake control element includes a brake lever 102 that is movably connected to a hood or housing 104 of the control device 100. The brake lever 102 operates components of the braking system of the bicycle 50. In one example, the brake system may include a hydraulic front brake mechanism 106 coupled to the front wheel 54 and/or a hydraulic rear brake mechanism 108 coupled to the rear wheel. In an alternate embodiment, the brake system may be a mechanical cable type brake system. As described in greater detail below, the control device 100 also includes a shift control element of an electronic shift control system. The shift control element includes a shift lever assembly 112 for shifting the gears of the bicycle 50.

Referring to FIGS. 2 and 3, different exterior views are depicted of the control device 100, which is constructed according to one example of the present disclosure. The control device 100 is mountable to the handlebar 64. In one example, the housing 104 includes a clamp 120, which may include an adjustable band that extends around the handlebar 64. In one example, the bicycle 50 may include a pair of the control devices 100, one on each of the left side and the right side of the handlebar 64, as is well known. Together, the pair of control devices 100 may be configured to operate the front derailleur 74 and the rear derailleur 76, respectively, and the front brake mechanism 106 and the rear brake mechanisms 108, respectively. In one example, the pair of control devices 100 may be identical to one another.

Figure 4:
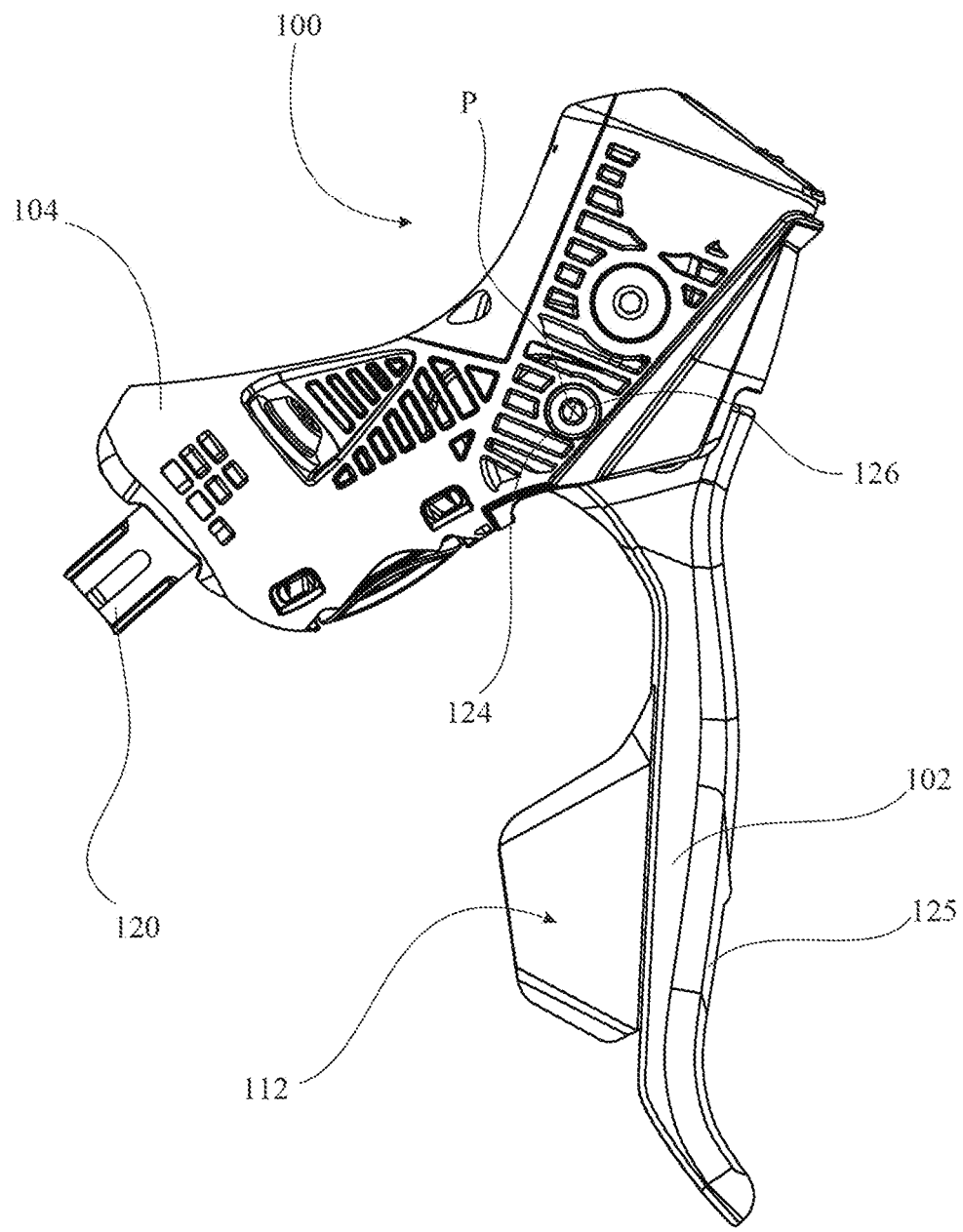
FIG. 4 is a first side view of the control device of FIG. 2 with a cover removed.
Figure 5:
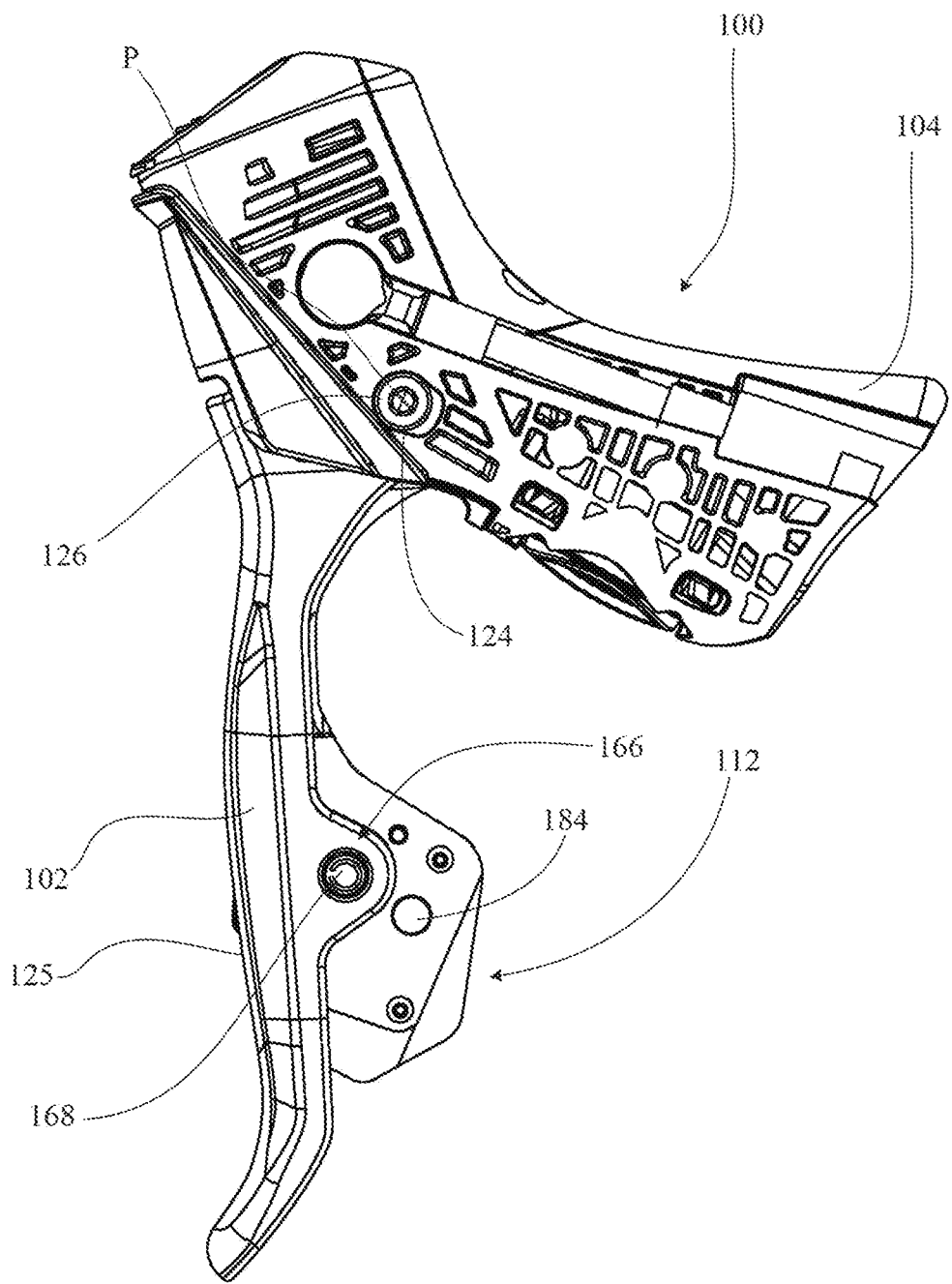
FIG. 5 is a second side view of the control device of FIG. 2 with the cover removed.

In the disclosed example, referring to FIGS. 4 and 5, the control device 100 includes a hood (e.g., the housing 104) that may be covered with an exterior or outer cover 122 (see FIGS. 2 and 3). The housing 104 is shaped and sized to be grasped by a hand of a user or rider, and the outer cover 122 may be configured to closely follow and overlie the shape of the housing 104. The housing 104 and outer cover 122 may serve as a grip or may together be configured as a graspable portion of the control device 100. The housing 104 may be formed of any number of materials, such as, for example, metal, plastic, and/or composite materials. For example, the housing 104 may be made of a fiber filled plastic or fiber reinforced plastic, such as glass filled polyamide or a carbon filled polyamide. The housing 104 is constructed to carry, house, and/or support various components and mechanisms of the control elements of the brake system and the electronic shift control system, as described in greater detail below. The outer cover 122 may be made of any number of materials, such as, for example, natural materials and/or synthetic elastomeric materials. The outer cover 122 may be configured to present a comfortable interface with the user and to reduce the tendency to become detached or moved from a position on an exterior of the housing 104. For example, the outer cover 122 may be formed of a flexible thermoplastic elastomer (TPE) such as Santoprene™. The outer cover 122 may be configured to be removably attached to and held in position on the housing 104 using any known securement or attachment method.

Figure 6:
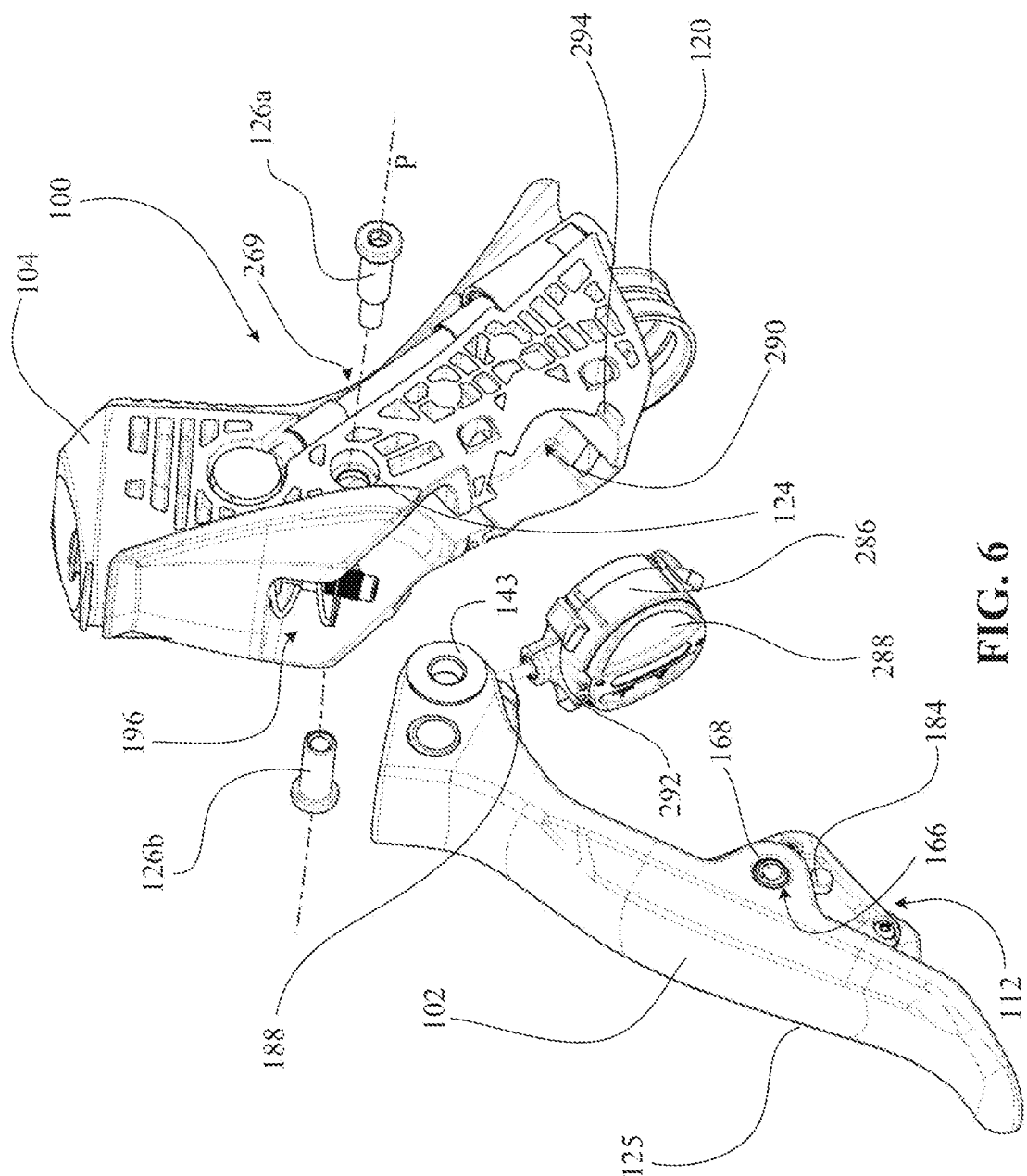
FIG. 6 is a perspective view of the control device of FIG. 2 with the cover removed and a brake lever disassembled from a housing of the control device.

In this example, referring to FIGS. 4-6 where the outer cover 122 has been removed, the brake lever 102 is pivotally or movably attached to the housing 104. The brake lever 102 may be attached to the housing 104 at or near a leading or front part of the housing 104 so that the brake lever 102 is spaced forward from the handlebar 64. The brake lever 102 may thus be pivotable relative to the housing 104 generally forward and rearward. The brake lever 102 may be made of any number of materials, such as, for example, metal (e.g., aluminum), plastic, and/or composite materials. The brake lever 102 may include a pivot bore or holes 124 near a proximal end. The pivot holes 124 may be aligned with one another and define a pivot axis P that is oriented generally perpendicular to a lengthwise axis of a grip handle 125 of the brake lever 102. The brake lever 102 may be attached to the housing 104 by an axle 126 formed by, for example, a pivot pin, a rod, a shaft, or the like, through the pivot holes.

In the disclosed example, referring to FIG. 2, the brake lever 102 may have a U-shaped recess or define a channel along at least a lengthwise portion of the grip handle 125. The shift lever assembly 112 may be positioned in a nested arrangement at least partially within the recess or channel, as described in more detail below. This nested arrangement of the shift lever assembly 112 with the brake lever 102, and the U-shape of the lever body, may impart some rigidity to the structure and may provide protection for components disposed within the channel. The shift lever assembly 112 may also be pivotally or movably attached to the housing 104, to a pivot mechanism, or to the brake lever 102. The shift lever assembly 112 may be positioned behind the brake lever 102 (e.g., between the brake lever 102 and the handlebar 64 when installed on the bicycle 50). The shift lever assembly 112 may be made of any number materials, such as, for example, plastic or composite materials. In one example, the shift lever assembly 112 may be made, at least in part, from a material that does not significantly inhibit wirelessly transmitted signals from penetrating the material.

Figure 7:
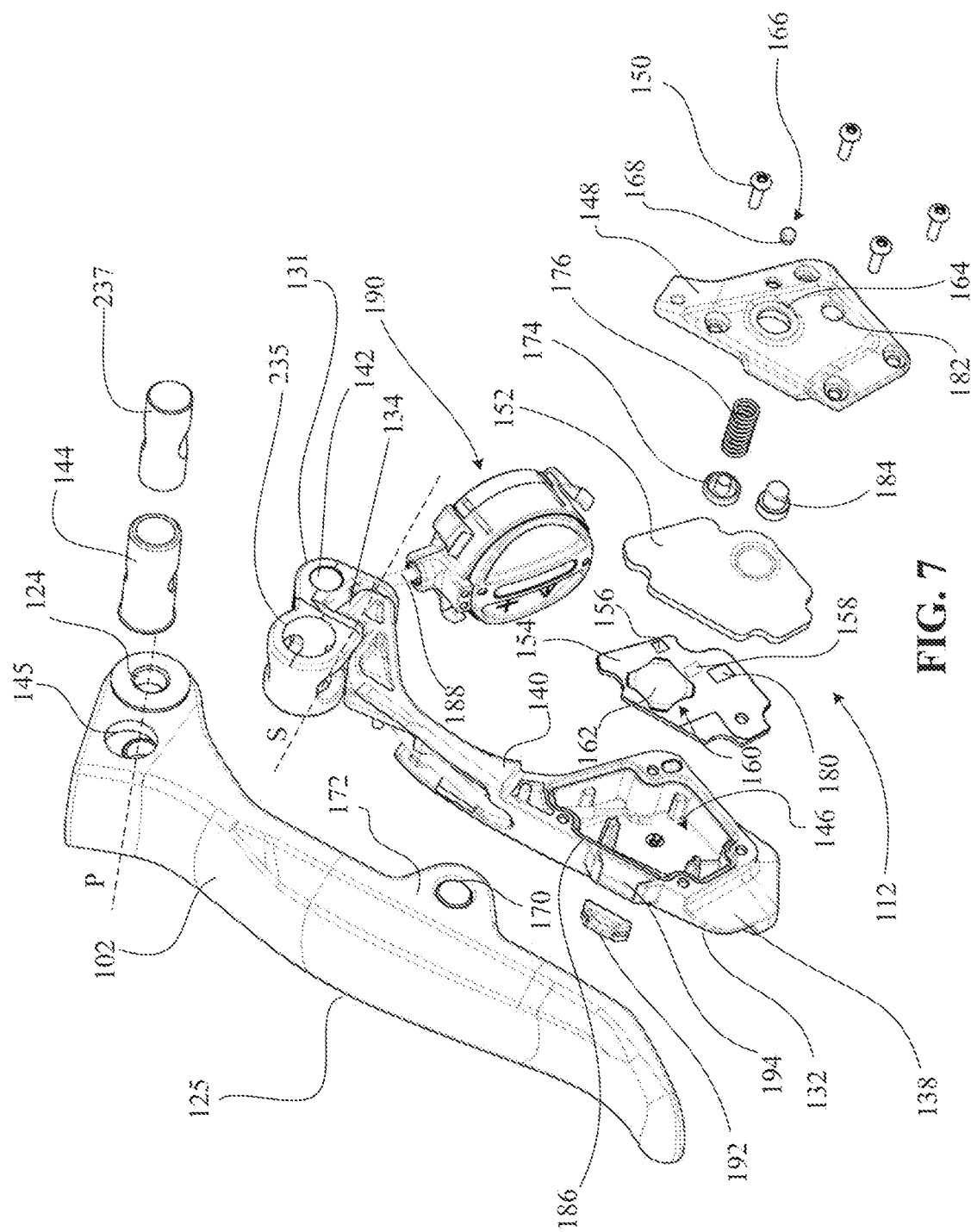
FIG. 7 is a first exploded perspective view of the brake lever and shift lever of FIG. 6.

Referring to FIG. 7, the shift lever assembly 112 may pivot laterally in a direction about an axis S that is generally perpendicular to the pivot axis P of the brake lever 102 about the axle 126. Thus, the shift lever assembly 112 may move in inboard and outboard directions relative to the bicycle 50 while staying nested and aligned with the brake lever 102.

The shift lever assembly 112 includes a bracket 131 and a shift lever 132. The shift lever 132 has a proximal end 134 that is directly or indirectly pivotably attached to the bracket 131, the housing 104, and/or the brake lever 102 by a pivot pin (not shown). The pivot pin defines the pivot axis S of the shift lever assembly 112. The shift lever 132 also has a distal or paddle end 138 that is opposite the proximal end 134 and a lever arm 140 (e.g., an elongate lever arm) connecting the proximal end 134 and the distal end 138. The lever arm 140 may be a closed hollow body or may be U-shaped or open sided and may include structural ribbing therein. The shift lever 132 may be made of any number of materials including, for example, a plastic.

In one example, the bracket 131 may have a transverse opening 142 that is positioned to accommodate the pivot axle 126 of the brake lever 102 passing through the shift lever assembly 112. For example, an assembly of the brake lever 102 and the shift lever assembly 112 is pivotably mounted to the housing 104 via a two piece axle 126. Referring to FIG. 6, the two piece axle 126 includes, on one side, a bolt 126a and, on the other side, a nut 126b that is fastened to the bolt 126a. In one embodiment, at least a portion of an outer annular surface of a shaft of the bolt 126a includes raised knurl features that help retain the bolt 126a within the hood of the control device 100. Two bushings 143 provide a low friction, compliant interface between the brake lever 102 and the axle 126.

Referring to FIG. 7, the proximal end 134 of the shift lever 132 and/or the bracket 131 may also carry connecting components for connecting the brake lever 102 to the hydraulic brake system. These components may include a sleeve 144 carried by the bracket 131 and spaced from and parallel to the transverse opening 142. When the shift lever assembly 112 is assembled to the brake lever 102, the sleeve 144 is received in a set of openings 145 at the proximal end of the brake lever 102, which are spaced from the pivot bore 124. The combination of the sleeve 144 and openings 145, along with the transverse opening 142 and the axle 126, marries the brake lever 102 and the shift lever assembly 112 together relative to the brake lever pivot axis P. The shift lever assembly 112 is thus configured to move in concert with the brake lever 102 about the pivot axis P when the brake system is operated, but moves independent of the brake lever 102 when the shift control system is operated. As described in more detail below, the paddle end 138 of the shift lever 132 includes an interior cavity 146 that houses electronic components of the shift lever assembly 112 and the shift control system.

Figure 8:
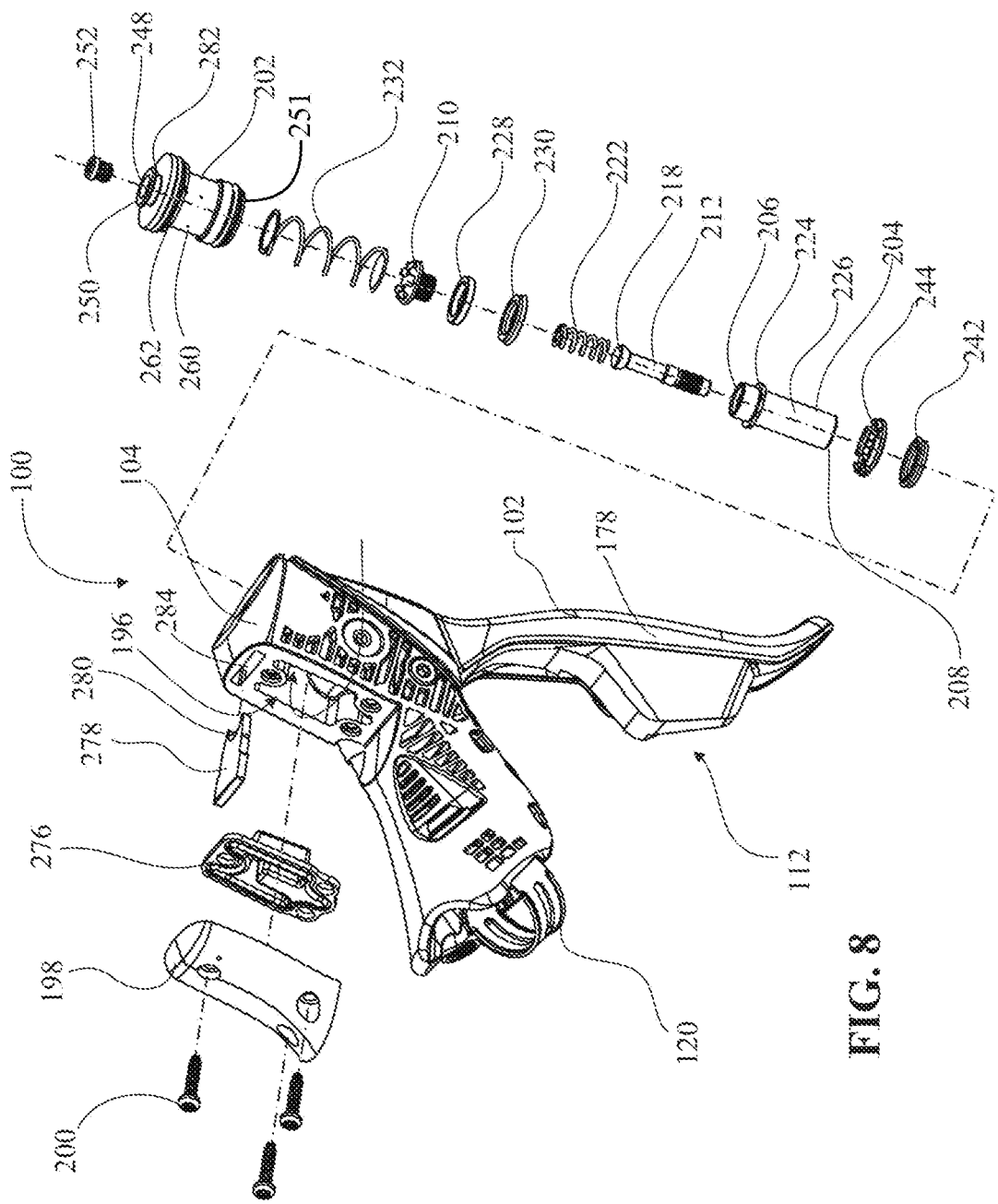
FIG. 8 is an exploded perspective view of brake system components of the control device of FIG. 2 with the cover removed.
Figure 9:
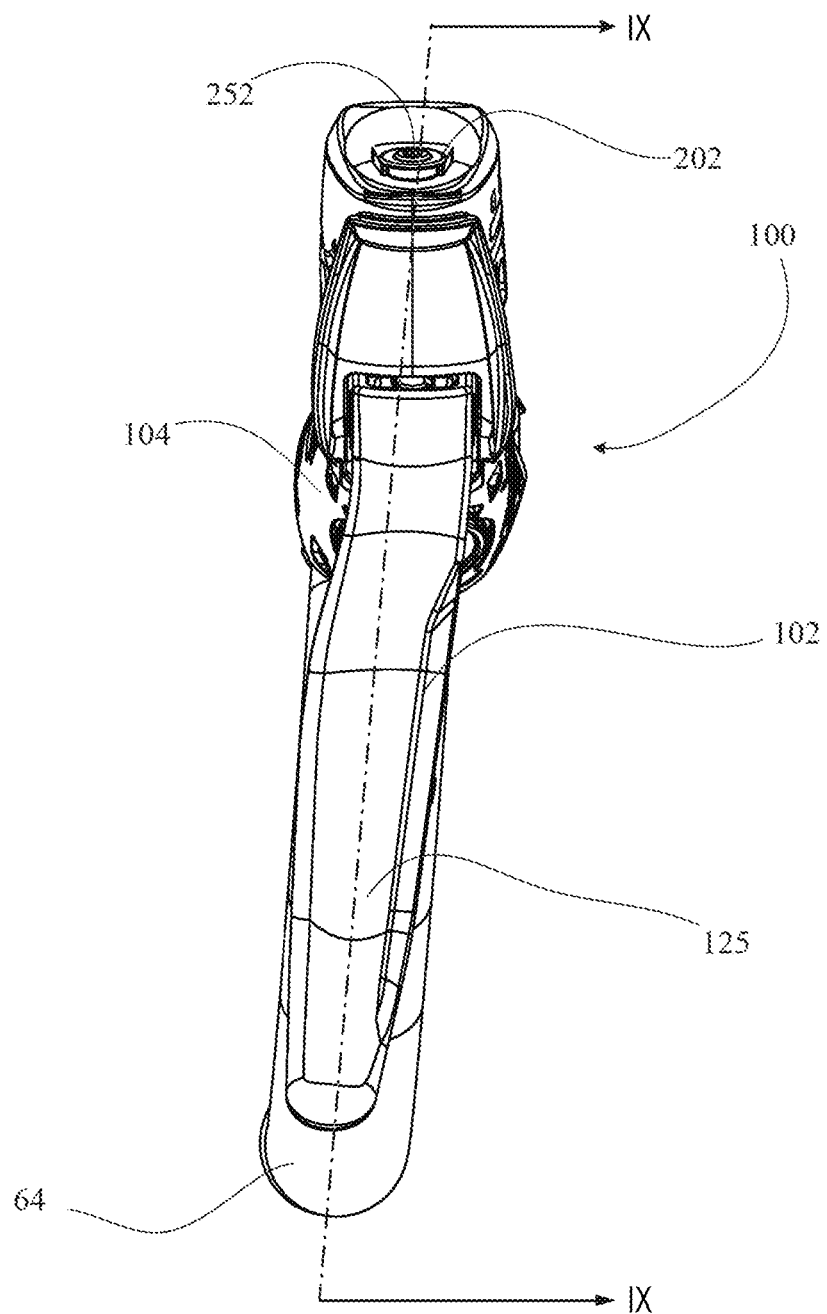
FIG. 9 is a front view of the control device of FIG. 2.

Referring to FIGS. 6-8, the bicycle control device 100 has four primary parts including the housing 104, the outer cover 122 (not shown, see FIGS. 2 and 3), the brake lever 102, and the shift lever assembly 112. The shift lever assembly 112 and the housing 104 each further include additional sub-components according to the teachings of the present disclosure. The sub-components of the shift lever assembly 112 are illustrated generally in FIG. 7, and the sub-components of the housing 104 are illustrated generally in FIG. 8.

In the disclosed example, referring to FIG. 7, the shift lever assembly 112 is a self-contained electrical assembly. In this example, the shift lever assembly 112 includes electronic components for operating the bicycle control device 100. Some of the electronic components in this example are housed within the interior cavity 146 in the paddle end 138 of the shift lever 132, and some of the electronic components are external to but electrically connected with the electronic components within the interior cavity 146 in the paddle end 138.

The paddle end 138 of the shift lever 132 in this example has a larger surface area than the adjoining lever arm 140. The paddle end 138 thus provides a convenient and ergonomic contact point for a user. The interior cavity 146 in the paddle end 138 includes a cover 148 that may be secured by fasteners 150 (e.g., four fasteners) to the paddle end 138 to close off and/or seal the interior cavity 146 and exclude water and other contaminants from entry into the interior cavity 146. A seal 152 may be interposed between the interior cavity 146 and the cover 148. The seal 152 may be a rubber seal membrane or layer of any suitable material that seals the interior cavity 146 in the paddle end 138 to prevent ingress of moisture or contaminants.

In one example, a printed circuit board (PCB) 154 is disposed within the interior cavity 146 in the paddle end 138. The interior cavity 146 houses the PCB 154 with two openings. For example, an electrical cable 188 is attached to the PCB 154 with a connector (e.g., a 2C board connector) and passes through a first opening of the two openings (not shown). The first opening of the interior cavity 146 may be sealed with, for example, a grommet. The PCB 154 is positioned within the interior cavity 146 via a second opening of the two openings of the interior cavity 146.

Various electronic componentry may be mounted on or connected to the PCB 154. The PCB 154 may include a communication module 156 configured to transmit signals from the control device 100. In one example, the communication module 156 may be configured for wireless transmission of signals in the form of electromagnetic radiation (EMR), such as radio waves or radio frequency signals. Optionally, the communication module 156 may also be configured to receive signals. In one example, the communication module 156 may be configured to receive signals that may be in the form of EMR such as radio waves or radio frequency signals. The communications module 156 may include or may be a transmitter, receiver, or a transceiver. The PCB 154 may also include an antenna 158 that is in operative communication with the communication module 156 to send and optionally also receive EMR signals. The antenna 158 may be any device configured to transmit and/or receive electromagnetic radiation waves (e.g., TV or radio waves).

In the disclosed example, the antenna 158 is on the PCB 154 in a position where the antenna 158 is able to send signals without significant interference from the structure of the bicycle control device 100 and/or from a hand of the rider. In another example, to help reduce or prevent interference, the antenna 158 may be a wireless antenna and may be positioned, at least in part, in or on a portion of the bicycle control device 100 that is separate and remote or spaced from the housing 104. The antenna 158 may be positioned on another part of the brake lever 102 or the shift lever 132, for example.

In one example, the bicycle control device 100 also includes a controller (not shown) that is, for example, also on the PCB 154. The controller is operatively connected to the communication module 156 to perform electronic operations such as generating the signals related to one or more of shifting, pairing, derailleur trim operations, power management, and the like. The controller may be programmable and configurable to generate signals to control the front derailleur 74 and the rear derailleur 76, for example. In one example, the controller may be a microcontroller with an internal memory. In another example, the communication module 156 may be programmable and configurable to transmit and/or receive signals to control the front derailleur 74 and the rear derailleur 76. In one example, the communication module 156 may be a transceiver. Any number of different types of microcontrollers and communications modules 156 may be utilized. Additionally, ancillary electrical and/or electronic devices and components may be used, as is well known in the art, to further enhance or enable the function and operation of the controller and the communications module 156 and related components.

In one example, the electronic components of the shift lever assembly 112 may also include at least one light source (not shown), (e.g., a light emitting diode (LED)). The LED may also be positioned on the PCB 154. The LED may convey status information to the rider, for example, relating to the electronic components and/or function of the shift lever assembly 112 or the bicycle control device 100.

In one example, the electronic components may include one or more electrical switches. For example, a first electrical switch 160, when actuated, may cause operations to be carried out by the controller and/or the communication module 156. Such operations may relate to signal transmission or reception, derailleur 74, 76 and control device 100 pairing, trim and/or shift operations, and the like. The first electrical switch 160 may generate signals to initiate or elicit an action and/or response from various mechanisms of the bicycle 50, such as the front derailleur 74 and/or the rear derailleur 76.

In this example, the first electrical switch 160 includes a contact (not shown) on the PCB 154 underlying a resilient dome switch element 162, also on the PCB 154. In this example, the first electrical switch 160 is actuated through the seal 152 from outside the interior cavity 146 in the paddle end 138 of the shift lever 132. The cover 148 has a first switch opening 164, where both the cover 148 and the first switch opening 164 are on an inward facing side of the shift lever 132 (e.g., a non-actuation side of the paddle end 138). An actuator 166 is seated in the first switch opening 164, as depicted in FIGS. 5 and 6. The actuator 166 includes a button 168 that is received in a hole 170 in an inside wall 172 of the brake lever 102. A spring retainer 174 is retained in the first switch opening 164 in the cover 148. A spring 176 extends between the button 168 and the spring retainer 174 and biases the shift lever 132 towards an outside wall 178 (see FIG. 8) of the brake lever 102. The rider, for example, operates the shift lever 132 by pushing inward on an actuation surface (e.g., an outside surface of the paddle end 138) against the bias force of the spring 176. As the rider pushes on the paddle end 138, the button 168 eventually contacts the spring retainer 174. Through the seal 152, the spring retainer 174 pushes against the resilient dome switch element 162, which further touches the contact on the PCB 154 to close and actuate the first electrical switch 160.

As another example, a second electrical switch 180 includes a contact on the PCB 154. The contact may be a domed switch element or a pressure type switch contact. In this example, the second electrical switch 180 is also actuated through the seal 152 from outside the interior cavity 146 and the shift lever 132. The cover 148 has a second switch opening 182, where both the cover 148 and the second switch opening 182 are again on the inward facing side of the shift lever 132 (e.g., the non-actuation side of the paddle end 138). A button 184 extends through and is seated in the second switch opening 182 in the cover 148, as depicted in FIGS. 5 and 6. The button 184 may be integrally formed as a part of the seal 152 or may be attached to material of the seal 152. The rider, for example, operates the second electrical switch 180 simply by depressing the button 184 toward the cover 148. The button 184 or the underlying material layer of the seal 152 may have a point contact (not shown) on the inside end, which pushes against the seal 152 to depress and close the contact to actuate the second electrical switch 180.

The first button 168 and the second button 184 operate through the material layer of the seal 152, whereby the integrity of the seal 152 for the interior cavity 146 in the paddle end 138 is not compromised. Other types of electrical switches may be used. The first electrical switch 160 may be used for operating the control device 100 on a frequent and more forceful basis, such as for initiation of a gear shift or gear change. The second electrical switch 180 may be an optional switch and, in this example, may be smaller and more self-contained. The second electrical switch 180 may be intended to be used less frequently than the first electrical switch 160. In one example, the second electrical switch 180 may be used for operations related to pairing the bicycle control device with a specific bicycle component, such as the front derailleur 74 and/or the rear derailleur 76, or for trimming the front derailleur 74 and/or the rear derailleur 76. The actuation of the first electrical switch 160 and the second electrical switch 180 sends signals through associated circuitry to be acted upon by the controller.

The electronic componentry on the PCB 154 and within the interior cavity 146 in the paddle end 138 is retained and sealed in place in the interior cavity 146. The seal 152 overlies the PCB 154 and is sandwiched between the paddle end 138 and the cover 148 of the shift lever 132 when the cover 148 is fastened to the shift lever 132 with, for example, the four fasteners 150. The seal 152 may be, for example, a gasket. Referring to FIG. 7, the paddle end 138 may include a groove 186 around an opening into the interior cavity 146. A rib on the seal 152 sits in the groove 186 to create a tight environmental seal when the cover 148 is secured to the paddle end 138. In one example, the second opening of the interior cavity 146 is sealed with the seal 152, which is compressed and retained by the cover 148; the cover 148 is fastened to the shift lever 132 with the four fasteners 150 in the form of thread-forming screws that install directly into the shift lever 132.

Referring to FIG. 7, the electrical cable 188 (e.g., a single, two wire (2C) electric cable) is electrically connected to the electronic componentry of the PCB 154 and is routed from the interior cavity 146 through an opening (e.g., the first opening of the interior cavity 146) into the lever arm 140. The electrical cable 188 extends along the interior of the lever arm 140 and is routed around the sleeve 144 and the transverse opening 142 on the proximal end 134 of the shift lever 132. In the disclosed example, the electrical cable 188 is connected to a power supply (e.g., a self-contained battery unit 190). The self-contained battery unit 190 is described in greater detail below.

The shift lever assembly 112 may include additional, fewer, and/or different components. For example, as shown in the example of FIG. 7, the shift lever assembly 112 may include a backer 192 that may be inserted between and sandwiched by the cover 148 and the paddle end 138 of the shift lever 132. Each of the cover 148 and the paddle end 138 of the shift lever 132 may be formed to define a receiving portion, such as a pocket 194, that captures an edge of the backer 192. The backer 192 may create a contact point between a top of the shift lever 132 and a contact surface on an inside surface of the brake lever inside wall 172. The contact surface may include a bump or protrusion positioned to contact the backer 192. The backer 192 may be captured between the bump on the inside surface of the brake lever inside wall 172 and the pocket 194 on the shift lever 132. The backer 192 may be formed from a durable material with low friction characteristics. In one example, the backer 192 may be made from a material different than the shift lever 132, such as Teflon or Titanium, and may be attached to the shift lever 132. The backer 192 may thus allow the shift lever 132 to slide laterally and easily relative to the brake lever 102 to inhibit binding and wear.

FIG. 6 shows a chamber 196 in the housing 104 where the brake lever 102 is connected to hydraulic brake system components. Referring to FIG. 8, the chamber 196 is accessible via a removable chamber cover 198. The chamber cover 198 may be secured to the housing 104 by screws 200 or other fasteners, snap connections, adhesive, or another type of securing device. Though not described in significant detail herein, the chamber 196 may house and provide access to components of the control device 100 for maintenance or adjustment. When the outer cover 122 is attached to the housing 104, the chamber cover 198 may be covered, hidden, and protected from the environment.

Figure 10:
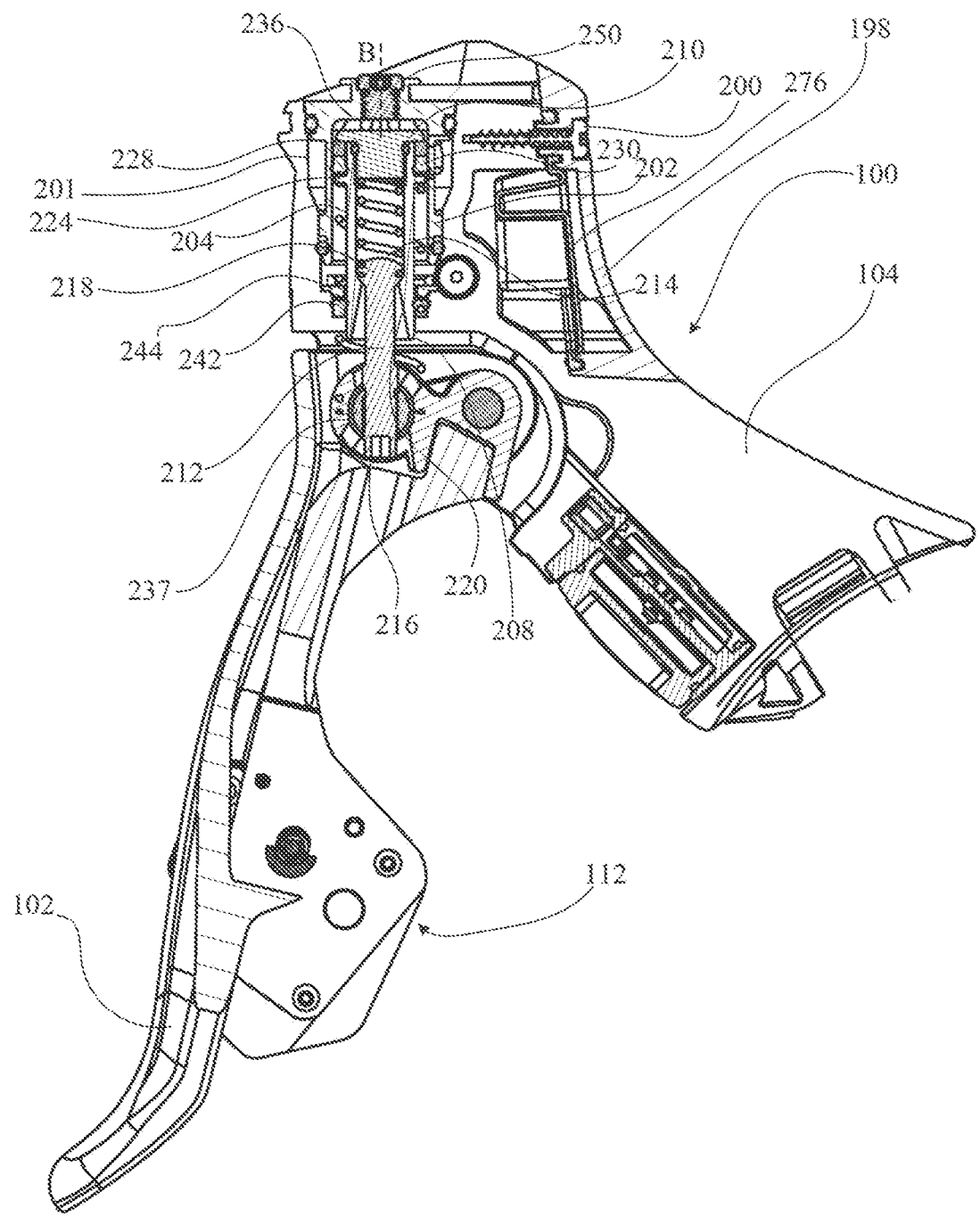
FIG. 10 is a cross-section of the control device of FIG. 9 taken along axis IX-IX.
Figure 11:
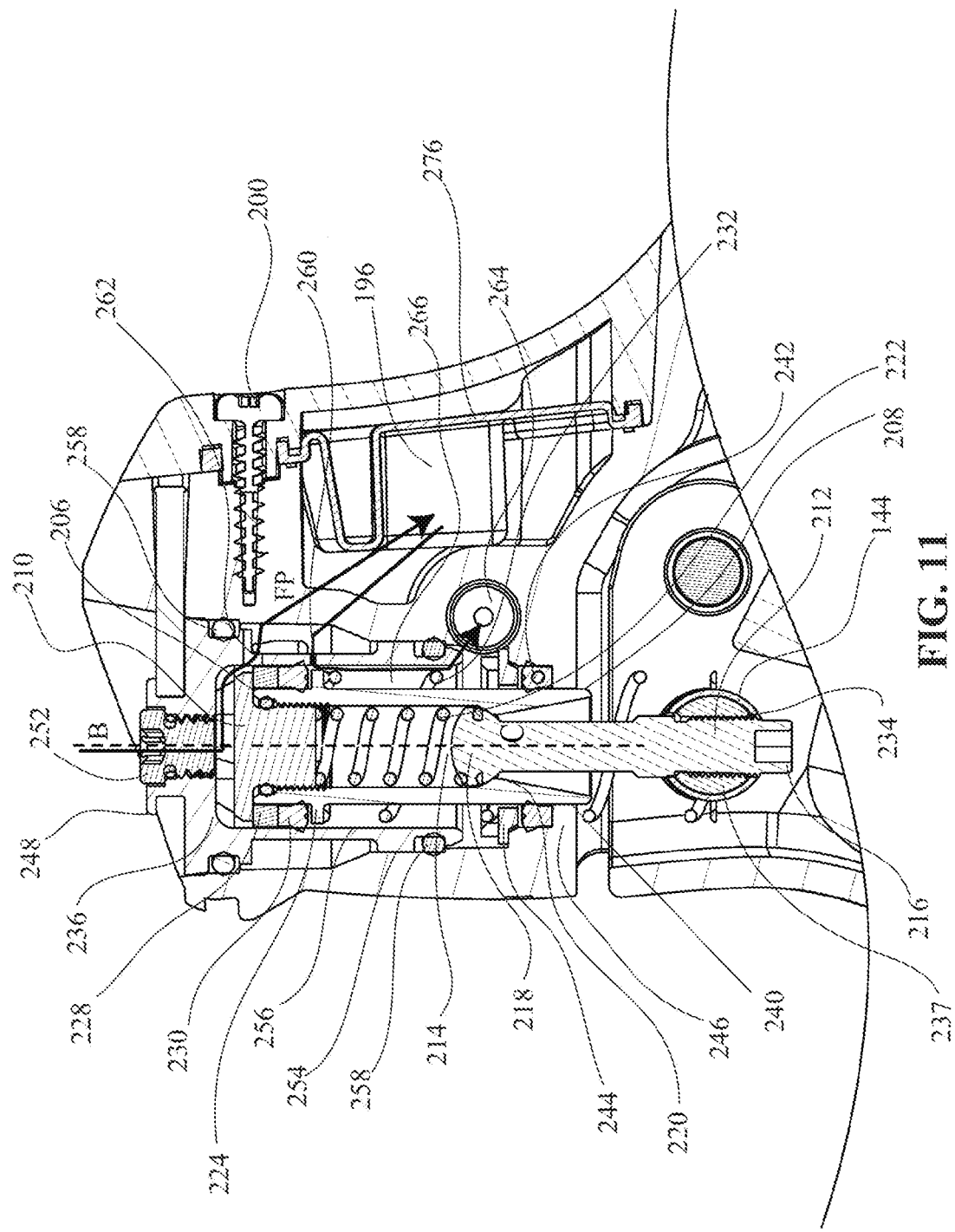
FIG. 11 is a close-up of part of the cross-section of the control device of FIG. 10.

Referring to FIGS. 8-11, the housing 104 may generally include a housing bore 201 with a master cylinder sleeve 202 (e.g., a fluid cylinder) inserted into the housing bore 201 and configured to act as a master cylinder for the brake system. The master cylinder sleeve 202 may be any number of sizes and/or shapes. For example, as shown in FIGS. 8, 10, and 11, the master cylinder sleeve 202 may be cylindrically shaped and may be hollow. The master cylinder sleeve 202 may be made of any number of materials including, for example, aluminum, an aluminum alloy, stainless steel, a plastic, a composite material, another material, or any combination thereof. In one example, the housing 104 is made of a first material (e.g., a glass filled polyamide), and the master cylinder sleeve 202 is made of a second material (e.g., aluminum) that is different than the first material. In another example, the first material and the second material are a same material.

At least part of a piston 204 resides in and moves relative to the master cylinder sleeve 202. The piston 204 has a first end 206 and a second end 208 opposite the first end 206. An end cap 210 (e.g., a piston top cap) is removably attachable (e.g., via corresponding threads) to the first end 206 of the piston 204. The piston 204 is coupled to the brake lever 102 via a pull rod 212 at or adjacent to the second end 208 of the piston 204 (e.g., at a position closer to the second end 208 of the piston 204 than the first end 206 of the piston 204) and is operable by movement of the brake lever 102 as is known in the art.

For example, as shown in FIGS. 10 and 11, the pull rod 212 has a first end 214 and a second end 216 opposite the first end 214. The first end 214 of the pull rod 212 includes a body 218 that is disposable within the piston 204. The piston 204 is hollow and has one or more inner surfaces 220 (e.g., inner annular surfaces, at least one of which is angled relative to a central axis along a length of the piston 204) sized and shaped to prevent the body 218 from exiting the second end 208 of the piston 204. For example, the one or more inner surfaces 220 of the piston 204 project inward at or adjacent to (e.g., closer to the second end 208 of the piston 204 than the first end 206 of the piston 204) the second end 208 of the piston 204, and the body 218 of the pull rod 212 may abut the one or more inner surfaces 220 of the piston 204. In an alternate embodiment, the piston may be solid and may include an external feature, rather than a pull rod, pulling on the piston. In an alternate embodiment, the piston and top cap may be machined together forming a single piece.

Referring to FIGS. 8, 10, and 11, a first spring 222 (e.g., a breakaway spring) is disposed within the piston 204 and between the end cap 210 and the body 218 of the pull rod 212. The breakaway spring 222 may be, for example, a compression spring and acts on the end cap 210 and the body 218 of the pull rod 212, such that the body 218 of the pull rod 212 is pressed into contact with the one or more inner surfaces 220 of the piston 204. In one embodiment, the breakaway spring 222 is disposed around part of the end cap 210.

The body 218 of the pull rod 212 is thus captive within a portion of the piston 204. When a force is applied to the brake lever 102, the applied force is partially transmitted to the piston 204 via the pull rod 212 (e.g., the body 218 of the pull rod 212). This transmitted force may cause the piston 204 to move (e.g., translate) relative to the master cylinder sleeve 202. When the brake lever 102 is released and the force is no longer applied, the breakaway spring 222 keeps the body 218 of the pull rod 212 pressed against the one or more inner surfaces 220 of the piston 204.

The piston 204 includes a flange 224 that extends away from and around an outer surface 226 (e.g., an outer annular surface) of the piston 204. The flange 224 may be disposed adjacent to the first end 206 of the piston 204 (e.g., closer to the first end 206 than the second end 208 of the piston 204). One or more components may be disposed between the flange 224 of the piston 204 and the end cap 210 when the end cap 210 is attached to the first end 206 of the piston 204. For example, a ring 228 (e.g., a backup ring) and a seal 230 (e.g., a cup seal) may be disposed around the piston 204 and/or the end cap 210, and between the end cap 210 (e.g., a head of the end cap 210) and the flange 224 of the piston 204. The backup ring 228 may be made of any number of materials including, for example, a metal, and the seal 230 may be made of any number of materials including, for example, polyurethane or rubber. The backup ring 228 and the seal 230 may be any number of shapes and sizes, respectively. For example, the backup ring 228 and the seal 230 may each be a hollow cylinder. The seal 230 is backed up by the backup ring 228, so that the seal 230 can handle high pressures.

A piston assembly may include any number of components including, for example, the piston 204, the end cap 210, the pull rod 212, the breakaway spring 222, the backup ring 228, and the seal 230. The piston assembly may include additional, fewer, and/or different components.

A second spring 232 (e.g., a return spring) is disposed within the master cylinder sleeve 202 and around part of the piston 204 and part of the pull rod 212. The return spring 232 extends between and acts on the flange 224 of the piston 204 and a portion of the brake lever 102 or another component (e.g., the sleeve 144). The pull rod 212 is coupled to the brake lever 102 at or adjacent to the second end 216 of the pull rod 212. Referring to FIG. 11, a portion of the pull rod 212 (e.g., at and/or adjacent to the second end 216 of the pull rod 212) extends through an opening 234 through the sleeve 144, and the pull rod 212 is attached to the brake lever 102 via a threaded connection within the sleeve 144.

For example, referring to FIG. 7, the sleeve 144 is positioned within an opening 235 through the bracket 131 of the shift lever assembly 112, in addition to the openings 145 through the brake lever 102, and a straight rod cross dowel 237 with threads (e.g., female threads) is positioned within the sleeve 144, which acts as a bushing. In other words, the straight rod cross dowel 237 with, for example, female threads and a single bushing (e.g., the sleeve 144) are retained and rotate within the brake lever 102. The straight rod cross dowel 237 functions as an attachment point for the pull rod 212, as the threads within the straight rod cross dowel 237 engage with threads (e.g., male threads) at and/or adjacent to the second end 216 of the pull rod 212.

The return spring 232 may be, for example, a compression spring and acts on the piston 204 and, for example, the portion of the brake lever 102 and/or another component (e.g., a spring capture), such that the piston 204 is biased upward and the end cap 210, when attached to the first end 206 of the piston 204, abuts an upper inner surface 236 of the master cylinder sleeve 202. In other words, the piston 204 is biased towards the upper inner surface 236 of the master cylinder sleeve 202. The upper inner surface 236 may be, for example, an uppermost inner surface of the master cylinder sleeve 202. The contact between the end cap 210 and the upper inner surface 236 of the master cylinder sleeve 202 locates the end cap 210 and the piston 204, and thus the seal 230, relative to the master cylinder sleeve 202.

When a force is applied to the brake lever 102 and the piston 204 translates relative to the master cylinder sleeve 202, away from the upper inner surface 236 of the master cylinder sleeve 202, the return spring 232 is compressed, and the end cap 210 moves out of contact with the upper inner surface 236 of the master cylinder sleeve 202. When the brake lever 102 is released and the force is no longer applied, the return spring 232 presses the end cap 210 back into contact with the upper inner surface 236 of the master cylinder sleeve 202.

Referring to FIG. 11, the housing bore 201 may include a first end 238 and a second end 240 opposite the first end 238. The housing bore 201 extends through the housing 104. The piston 204 and/or the pull rod 212 may extend through the second end 240 of the housing bore 201. Additional components of the hydraulic brake system may be disposed at and/or adjacent to the second end 240 of the housing bore 201 for sealing and component retention. For example, as shown in FIGS. 8, 10, and 11, a seal 242 and a capture 244 (e.g., a lower spring capture) may be disposed within the housing bore 201, around the piston 204.

Referring to FIG. 11, the seal 242 and the capture 244 may be disposed adjacent to the second end 240 of the housing bore 201. For example, the housing 104 includes a shelf 246 that defines the second end 240 of the housing bore 201, and the seal 242 is disposed on the shelf 246. The capture 244 is adjacent to or abuts the seal 242. The seal 242 protects components of the hydraulic brake system within the housing 104 from the environment, and the capture 244 helps retain the return spring 232 and the master cylinder sleeve 202 within the housing bore 201.

The seal 242 may be any number of sizes and shapes, and may be made of any number of different materials including, for example, rubber. The capture 244 may also be any number of sizes and shapes, and may be made of any number of different materials including, for example, a metal.

Referring to FIGS. 8-11, the master cylinder sleeve 202 includes an opening 248 (e.g., a bleed port) that extends through the master cylinder sleeve 202 at, for example, a first end 250 (e.g., an upper end) of the master cylinder sleeve 202. A bleed plug 252 (e.g., a bleed screw) is removably connectable via, for example, corresponding threads to the bleed port 248, such that hydraulic fluid of the brake system may be filled, topped off, or bled via the chamber 196. The bleed plug 252 may be any number of shapes and sizes, and may be made of any number of materials. In one example, the bleed plug 252 is made of the same material as the master cylinder sleeve 202. For example, the bleed plug 252 is made of the second material (e.g., aluminum), which is different than the material of the which the housing 104 is made (e.g., the first material). Alternatively, the bleed plug 252 may be made of the same material as the housing 104.

Referring to FIG. 11, the bleed plug 252 has a central axis B that extends along a length of the bleed plug 252, and the master cylinder sleeve 202 has a central axis C that extends along a length of the master cylinder sleeve 202. In the example shown in FIG. 11, when the bleed plug 252 is connected to the master cylinder sleeve 202 at the bleed port 248, the central axis B of the bleed plug 252 extends through the bleed port 248 and is in line with the central axis C of the master cylinder sleeve 202. In other words, the bleed plug 252, when connected to the master cylinder sleeve 202 at the bleed port 248, may be concentric with the master cylinder sleeve 202.

In another example, the bleed plug 252 may be connected to the master cylinder sleeve 202 or the housing 104, such that the central axis B of the bleed plug 252 is offset relative to the central axis C of the master cylinder sleeve 202. In other words, the bleed plug 252, when connected to the master cylinder sleeve 202 at the bleed port 248, may not be concentric with the master cylinder sleeve 202. For example, the bleed port 248 may be offset relative to the central axis C of the master cylinder sleeve 202.

When the bleed plug 252 is removed, the chamber 196 is accessible via the end cap 210 and the master cylinder sleeve 202. In other words, the master cylinder sleeve 202 is in fluid communication with the chamber 196, which may act as a brake fluid chamber for the brake system.

Referring to FIG. 11, the master cylinder sleeve 202 has one or more outer annular surfaces 254 and one or more inner annular surfaces 256. In the example shown in FIG. 8, the master cylinder sleeve 202 has seven outer annular surfaces 254 with a number of different diameters, respectively, for positioning of, for example, seals 258 (e.g., O-rings) on the master cylinder sleeve 202 to protect parts of the hydraulic brake system (e.g., the master cylinder sleeve 202 and the piston assembly) from the environment. The master cylinder sleeve 202 may have more or fewer outer annular surfaces 254. In the example shown in FIG. 11, the master cylinder sleeve 202 has one inner annular surface 256. The master cylinder sleeve 202 may have more inner annular surfaces 256.

Referring to FIG. 8, the master cylinder sleeve 202 includes one or more first openings 260 (e.g., a first opening) and one or more second openings 262 (e.g., a second opening). The first opening 260 and the second opening 262, for example, extend from at least one of the one or more outer annular surfaces 254, through the master cylinder sleeve 202 (e.g., through a cylindrical wall of the master cylinder sleeve 202), to at least one of the one or more inner annular surfaces 256, respectively. In other words, the first opening 260 and the second opening 262 extend radially through the master cylinder sleeve 202.

The second opening 262 is positioned at a distance along the length of the master cylinder sleeve 202 relative to the first opening 260. In other words, the second opening 262 is spaced apart relative to the first opening 260 in a direction along the length of the master cylinder sleeve 202. In the example shown in FIG. 8, the second opening 262 is closer to the first end 250 of the master cylinder sleeve 202 than the first opening 260 is relative to the first end 250 of the master cylinder sleeve 202.

In one example, the one or more second openings 262 are compensation ports (hereinafter, referred to as compensation ports), and the one or more first openings 260 are timing ports (hereinafter, referred to as timing ports). The one or more compensation ports 262 and the one or more timing ports 260 may be any number of shapes and sizes. For example, one or more compensation ports 262 and the one or more timing ports 260 may be circular-shaped openings. In one example, as flow through the one or more compensation ports 262 is to be less controlled than the flow through the one or more timing ports 260, the one or more compensation ports 262 may be larger (e.g., in diameter) compared to the one or more timing ports 260.

Referring to FIG. 11, as discussed above, the piston assembly (e.g., the end cap 210) is biased against the upper inner surface 236 of the master cylinder sleeve 202 when the brake lever 102 is not pulled. The upper inner surface 236 of the master cylinder sleeve 202 acts as a stop and locates an initial position of the piston 204 relative to the master cylinder sleeve 202. This also locates the seal 230, which is disposed around the piston 204, relative to the master cylinder sleeve 202. More specifically, the seal 230 disposed around the piston 204 is located relative to the timing port 260 extending through the master cylinder sleeve 202. In the example shown in FIG. 11, the seal 230 is located adjacent to the timing port 260 when the brake lever 102 is not pulled (e.g., when the end cap 210 is in contact with the upper inner surface 236 of the master cylinder sleeve 202; an initial position of the piston assembly).

When the piston assembly is in the initial position and the bleed plug 252 is removed, the control device 100 has a fluid path FP between the bleed port 248 (e.g., at the first end 250 of the master cylinder sleeve 202), which is exposed to the environment when the bleed plug 252 is removed, and a fluid port 264 (e.g., adjacent to a second end of the master cylinder sleeve 202 opposite the first end 250) supported by the housing 104. The fluid port 264 is fluidly connected to a hydraulic line 110 that leads to, for example, the hydraulic front brake mechanism 106 or the hydraulic rear brake mechanism 108. The fluid port 264 may be, for example, rotatable relative to the housing 104.

Referring to FIG. 6, the control device 100 includes a lever body hose assembly 269. The lever body hose assembly 269 is or includes a flexible portion of hose that directs fluid from the housing 104 of the control device 100 to a caliper assembly of the hydraulic front brake mechanism 106 or the hydraulic rear brake mechanism 108 via, for example, a hose connector (e.g., a Stealthamajig valve assembly by SRAM®) and the hydraulic line 110. The hose connector may include, for example, a barb and a compression fitting. Due to the nature of the hydraulic line 110 being at high pressure, the hydraulic line 110 has a degree of memory, which may make cleanly routing the hydraulic line 110 along the handlebar 64 difficult. The hose connector may, for example, be rotatable relative to the lever body hose assembly 269. This allows the user to connect the lever body hose assembly 269 of the control device 100 and the caliper assembly with the hydraulic line 110 and the hose connector, and rotate the hydraulic line 110 and the hose connector relative to the lever body hose assembly 269 for the best and cleanest routing along the handlebar 64.

The fluid path FP between the bleed port 248 and the fluid port 264 extends through the end cap 210, the second opening 262, the chamber 196, the first opening 260, and a volume 266 between the master cylinder sleeve 202 and the piston 204.

In the embodiment in which the central axis B of the bleed plug 252 is offset relative to the central axis C of the master cylinder sleeve 202, a fluid path between the bleed port 248 and the fluid port 264 extends through a volume between the upper inner surface 236 of the master cylinder sleeve 202 and the end cap 210, the second opening 262, the chamber 196, the first opening 260, and a volume 266 between the master cylinder sleeve 202 and the piston 204. In this embodiment, a portion of the master cylinder sleeve 202 may extend away from the upper inner surface 236 (e.g., an extended portion), such that the end cap 210 abuts the extended portion of the master cylinder sleeve 202 and the volume between the upper inner surface 236 of the master cylinder sleeve 202 and the end cap 210 is formed. In another example for this embodiment, the fluid path also extends through the end cap 210. In the embodiment where the central axis B of the bleed plug 252 is offset relative to the central axis C of the master cylinder sleeve 202, the piston top cap may or may not be castled.

Figure 12:
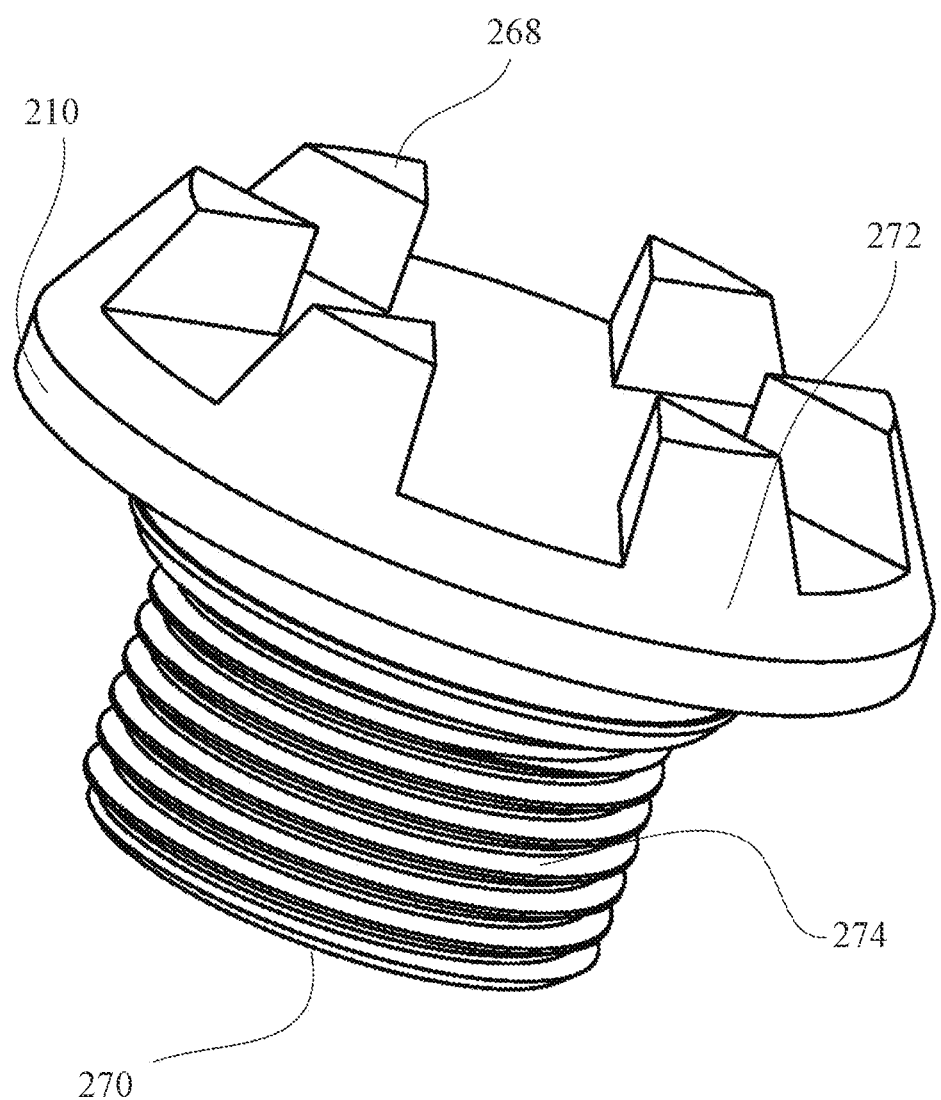
FIG. 12 is an exterior perspective view of a piston end cap of the control device of FIG. 8.

Referring to FIG. 12, the end cap 210 has a first end 268 and a second end 270 opposite the first end 268. The first end 268 of the end cap 210 includes a head 272, and threads 274 extend from the second end 270 of the end cap 210 towards the head 272 of the end cap 210. The head 272 of the end cap 210 is castled, such that the flow path, when the bleed plug 252 is removed, extends between the bleed port 248 and the second opening 262 via the castling in the head 272 of the end cap 210. The end cap 210 may be any number of shapes (e.g., shapes of the castling) and sizes (e.g., length of the end cap 210, number and/or size of threads), and may be made of any number of different materials (e.g., aluminum). The castling reduces the weight of the piston assembly and thus, the weight of the control device 100.

Referring to FIG. 8, a compliant or flexible membrane 276 may be provided over an open side of the chamber 196 to close off the chamber 196 and thus provide a defined fluid chamber having a variable volume. The flexible membrane 276 may be positioned between the chamber cover 198 and the open side of the chamber 196, as depicted in FIGS. 8, 10, and 11. The chamber 196, as at least partially defined by the flexible membrane 276, the housing 104, and the master cylinder sleeve 202, is filled with a fluid (e.g., an incompressible fluid) such as, for example, hydraulic brake fluid.

When the rider pulls the brake lever 102 and the brake lever 102 rotates relative to the housing 104 (e.g., in a first rotational direction), the pull rod 212 connected to the brake lever 102 and the piston 204 pulls the piston, such that the piston 204 translates in a direction away from the upper inner surface 236 of the master cylinder sleeve 202 (e.g., in a first direction). This translation of the piston 204 also causes the seal 230 disposed around the piston 204 and abutting the flange 224 of the piston 204 to translate in the direction away from the upper inner surface 236 of the master cylinder sleeve 202. In other words, the translation of the piston 204 away from the upper inner surface 236 of the master cylinder sleeve 202 causes the seal 230 to move in a direction towards the timing port 260 (e.g., in the first direction). The seal 230 moving across the timing port 260 pushes a portion of the fluid within the chamber 196 out of the volume 266 between the master cylinder sleeve 202 and the piston 204, and into the hydraulic line 110 via the fluid port 264. This actuates the hydraulic front brake mechanism 106 or the hydraulic rear brake mechanism 108. Alternatively, other techniques may be used.

Air within, for example, the fluid path FP between the bleed port 248 and the fluid port 264 and/or within the hydraulic line 110 causes inefficiencies within the hydraulic braking system and may result in a spongy or loose brake lever 102. Air may be introduced into the fluid path FP via leaks, old seals, damaged hydraulic lines, and/or other reasons. Air within the fluid path FP may be purged in either direction, out the bleed port 248 within the master cylinder sleeve 202 when the bleed plug 252 is removed or out the fluid port 264 or the hydraulic line 110.

The control device 100 may include additional, fewer, and/or different components. For example, referring to FIGS. 8, 10 and 11, the control device 100 may also include a connector 278 that, for example, translationally fixes the master sleeve cylinder 202 relative to the housing 104. The connector 278 is, for example, a plate with a collar 280 that engages with a portion of the master cylinder sleeve 202 (e.g., under a flange 282 at the first end 250 of the master cylinder sleeve 202). For example, the master cylinder sleeve 202 is disposed within the housing bore 201, and the connector 278 is inserted into a corresponding opening 284 within the housing 104. The collar 280 of the connector 278 engages with the master cylinder sleeve 202 underneath the flange 282 of the master cylinder sleeve 202. The flexible membrane 276 and the cover 198 keep the connector 278 within the opening 284 within the housing 104 and the collar 280 engaged with the master cylinder sleeve 202. The master cylinder sleeve 202 may be supported within the housing 104 in different and/or additional ways.

In addition to the hydraulic brake system components discussed above, the housing 104 also supports the self-contained battery unit 190 (e.g., a battery unit). Referring to FIG. 6, the battery unit 190 includes a battery case 286 and one or more battery covers 288. The battery case 286 is received in a recess 290 in the housing 104 and is fixedly attached to the housing 104 via one or more connectors (e.g., tabs or snap features). In this example, the battery case 286 is fastened to the housing 104 via a plurality of attachment features 292 extending away from one or more outer surfaces (e.g., an outer annular surface) of the battery case 286 and/or at least one of the one or more battery covers 288 and corresponding grooves or slots 294 of the recess 290. The plurality of attachment features 292 may include, for example, tabs (e.g., four cantilever snap-fit features; hereinafter, referred to as snap-fit features) extending away from, for example, the one or more outer surfaces of the battery case. Alternatively or additionally, the battery case 286 may be attached to the housing 104 via adhesive, fasteners, and/or another type of connector. More or fewer than four snap-fit features 292 may be provided.

Figure 13:
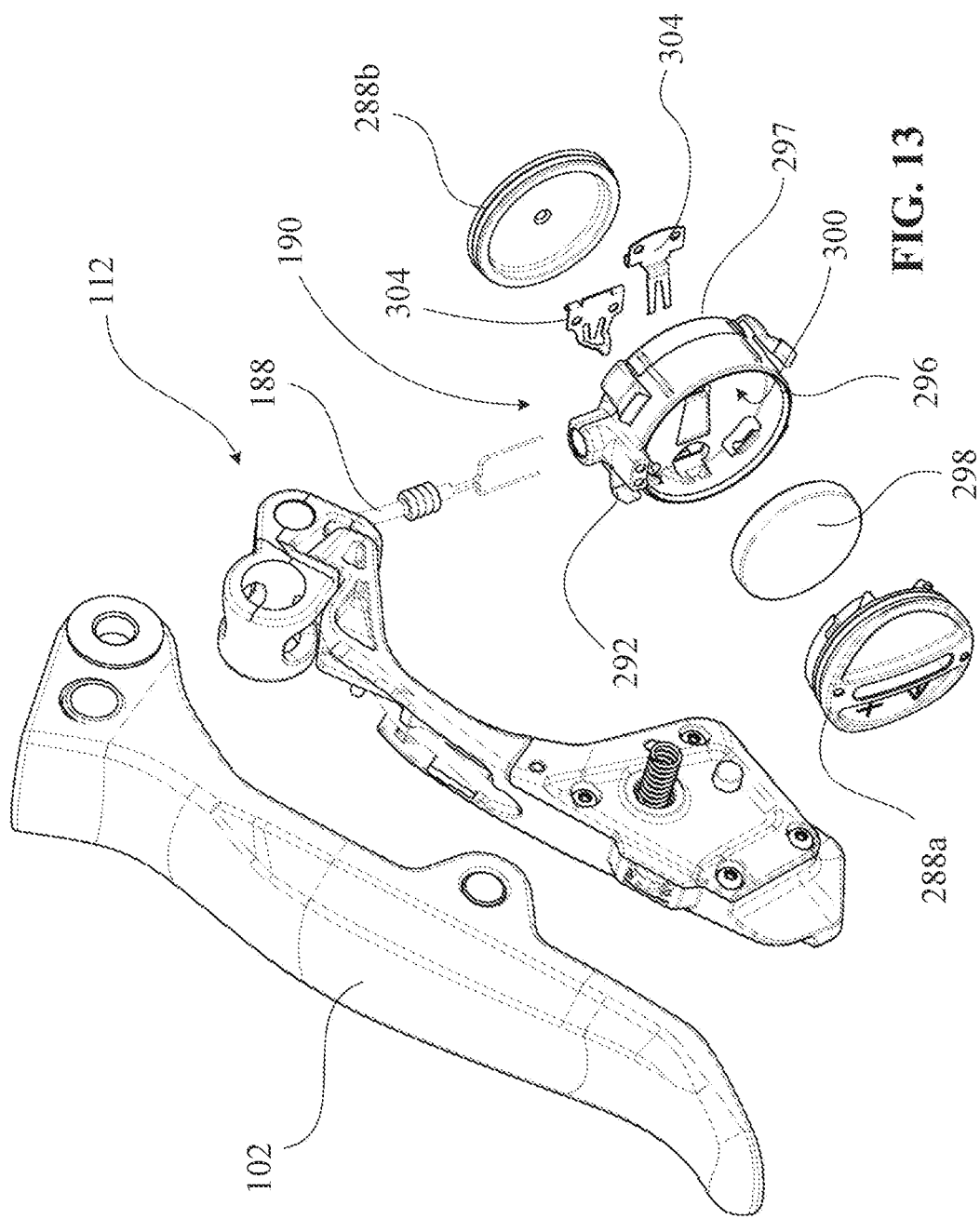
FIG. 13 is a second exploded perspective view of the brake lever and the shift lever of FIG. 6 with an exploded view of the battery assembly.
Figure 14:
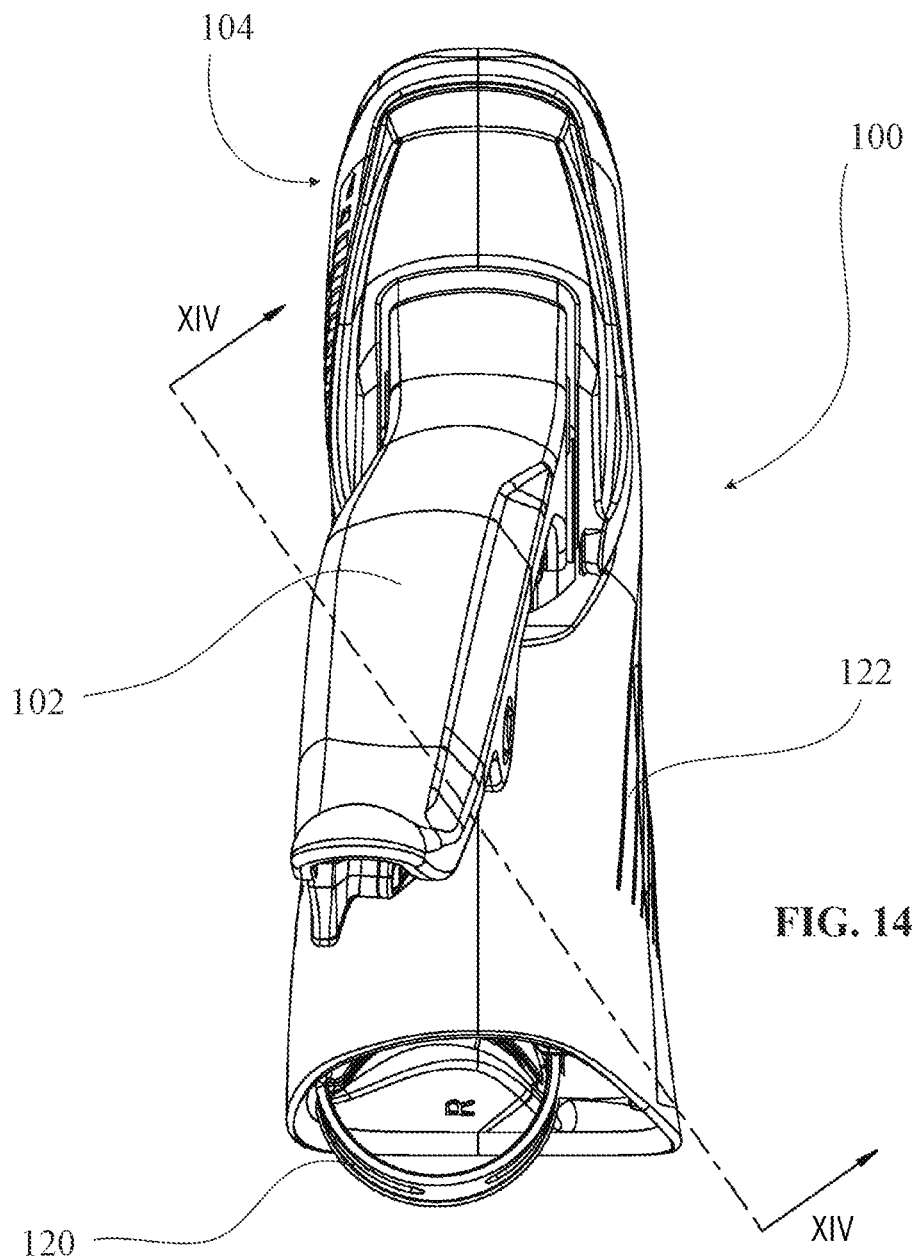
FIG. 14 is a bottom view of the control device of FIG. 2.

Referring to FIG. 13, the self-contained battery unit 190 may include a first battery cover 288a at a first side 296 of the battery case 286 and a second battery cover 288b at a second side 297 of the battery case 286. The second side 297 of the battery case 286 is opposite the first side 296 of the battery case 286. A battery 298 may be received within a battery receptacle 300 (e.g., including a first cavity or recess) defined by the battery case 286 and open to the exterior of the housing 104. The battery receptacle 300 is at the first side 296 of the battery case 286. The battery 298 may be any number of different types of batteries including, for example, a conventional and replaceable coin cell type battery. Alternatively, the battery 298 may be a non-replaceable and/or rechargeable battery.

In other embodiments, other configurations may be provided. For example, the self-contained battery unit 190 may include more or fewer battery covers. In one embodiment, the self-contained battery unit 190 includes only one battery cover (e.g., the first battery cover 288a). A portion of the housing 104 within the recess 290 in the housing 104 may protect and close off the second side 297 of the battery case 286 when the self-contained battery unit 190 is positioned within the recess 290 in the housing 104.

The first battery cover 288a and the second battery cover 288b cover the first side 296 of the battery case 286 and the second side 297 of the battery case 286, respectively, in that the first battery cover 288a protects the self-contained battery unit 190 at and adjacent to the first side 296 of the battery case 286 (e.g., the battery 298 adjacent to the first side 296) and the second battery cover 288b protects the self-contained battery unit 190 at and adjacent to the second side 297 of the battery case 286 (e.g., electrical contacts adjacent to the second side 297). The first battery cover 288a and the second battery cover 288b, for example, at least partially close off the battery case 286 at the first side 296 and the second side 297 of the battery case 286, respectively.

For example, in one embodiment, the second battery cover 288b only partially closes off the second side 297 of the battery case 286, respectively, such that, for example, the electrical contacts are accessible through the second battery cover 288b. In other words, the second battery cover 288b is a partial cover. Additionally or alternatively, the first battery cover 288a may be a partial cover. In another embodiment, the first battery cover 288a and the second battery cover 288b are full covers, such that the battery case 286 is sealed from the environment at the first side 296 and the second side 297 of the battery case 286, respectively.

The battery 298 may be configured to provide power for the controller, the communication module 156, remote switches or electrical devices via accessory jacks, and/or other electronic components. Referring to FIGS. 13-17, the self-contained battery unit 190 also includes seals 302 (e.g., O-rings; see FIGS. 15 and 17) for the first battery cover 288a and the second battery cover 288b, respectively, electrical contacts 304 (e.g., two battery electrical contacts 304), and a grommet seal 306 (see FIG. 17).

Figure 15:
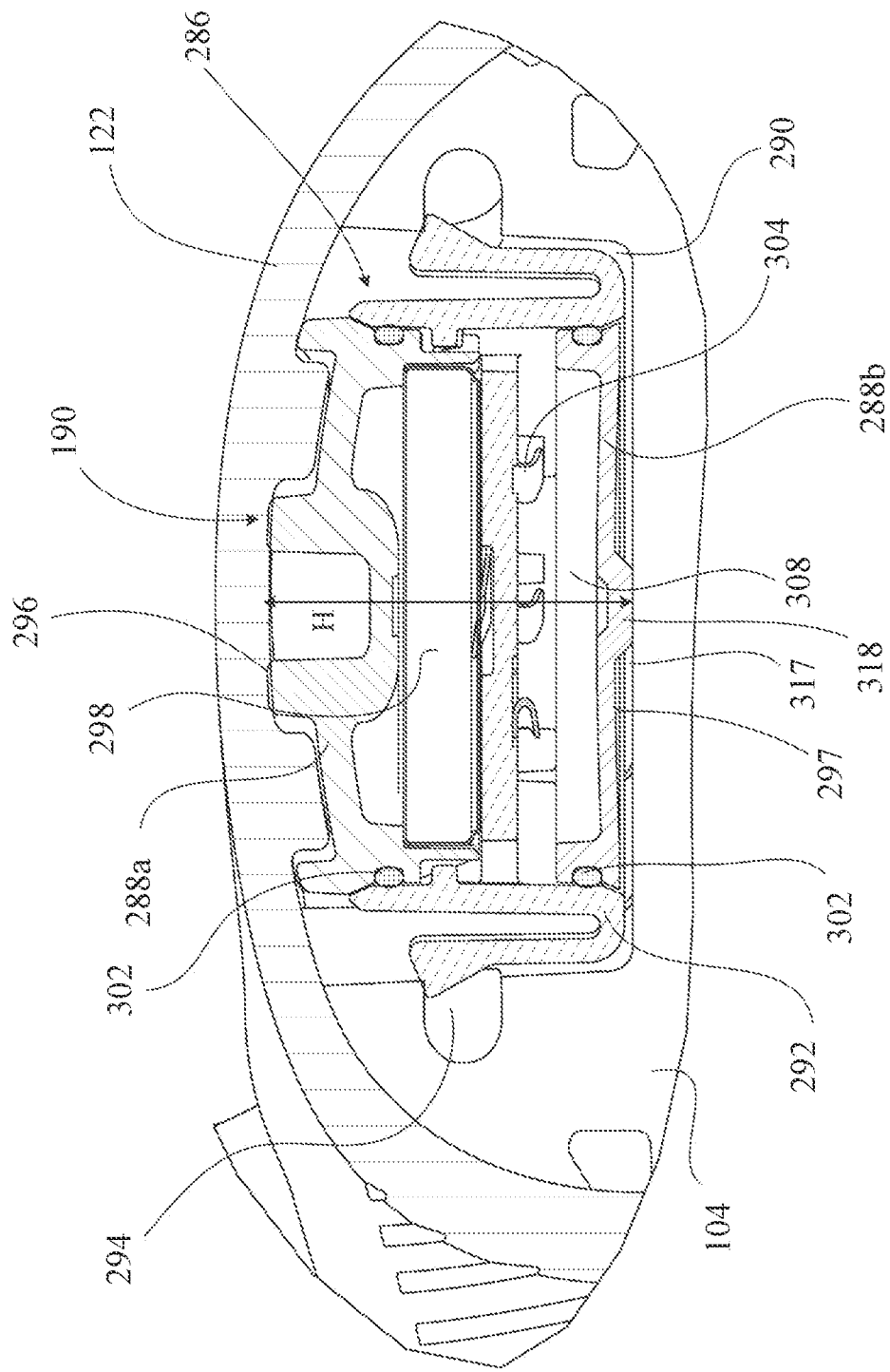
FIG. 15 is a close-up cross-section of a battery assembly of the control device of FIG. 14 taken along axis XIV-XIV.
Figure 16:
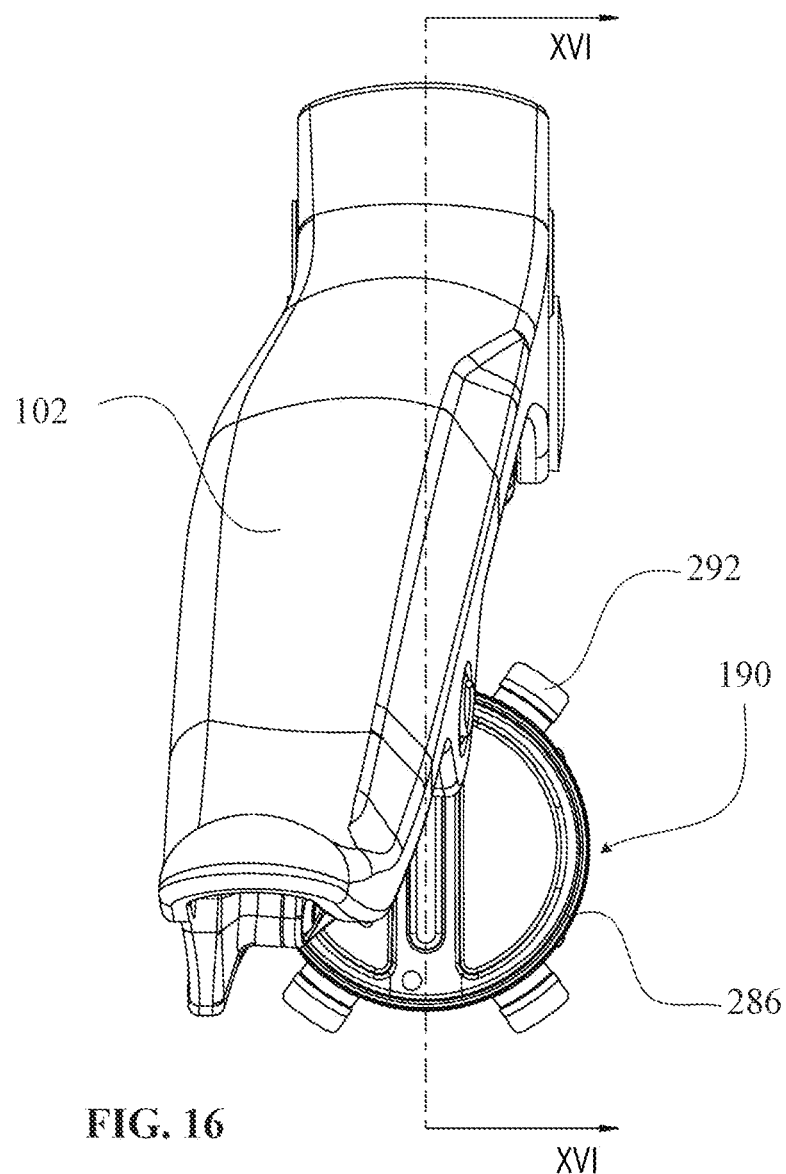
FIG. 16 is a bottom view of a brake lever and a shift lever assembly of the control device of FIG. 2.

Referring to FIG. 15, the battery case 286 has one cavity 308 (e.g., a second cavity or recess; an internal cavity) internal to the housing 104 with two openings, and one cavity 300 external to the housing 104 (e.g., the battery receptacle 300; an external cavity) with one opening. The internal cavity 308 houses the electrical contacts 304, which are fixed to the battery case 286, and terminations of wires from the electrical cable 188. In one example, the electrical contacts 304 are physically connected to the battery case 286 via plastic heat staking, though the electrical contacts 304 may be fixed to the battery case 286 in additional and/or different ways. The wires of the electrical cable 188 may be physically connected to the electrical contacts 304 in any number of ways including, for example, via crimp features and solder.

Referring to FIG. 17, the electrical cable 188 passes through a first opening 310 of the two openings to the internal cavity 308, and the first opening 310 to the internal cavity 308 is sealed with, for example, the grommet seal 306. A second opening 314 of the two openings to the internal cavity 308 is sealed with, for example, an O-ring 302 and the second battery cover 288b.

The electrical contacts 304 pass from the internal cavity 308 into the external cavity 300 to interface with the battery 298. The battery 298 is retained within the external cavity 300 by the first battery cover 288a. The opening 316 of the external cavity 300 is sealed with, for example, an O-ring 302 between the first battery cover 288a and the battery case 286. When the self-contained battery unit 190 is retained within the recess 290 in the housing 104 via the snap-fit features 292, the second battery cover 288b is held in place in the internal cavity 308 of the battery case 386 via contact with an inner surface 317 of the housing 104 and/or the cover 122.

Referring to FIG. 15, the second battery cover 288b may include a raised portion 318 (e.g., an extension, a rib, a ridge, or an offset) that extends away from the second side 297 of the battery case 286. With the raised portion 318, a maximum height H of the battery case 286 may be greater than a maximum depth of the recess 290 in the housing 104 between the cover 122 and the inner surface 317 of the housing 104. The second battery cover 288b may be deformable, and this size difference may cause the second side 197 of the battery case 286 to flex away from the inner surface 317 of the housing 104 when the self-contained battery unit 190 is installed within the recess 290 in the housing 104. In other words, when the self-contained battery unit 190 is positioned within the recess 290 in the housing 104 and the snap-fit features 292, for example, are fit into the corresponding grooves or slots 294, the raised portion 318 of the second battery cover 288b abuts the inner surface 317 of the housing 104; when the cover 122 is attached to the housing 104 and presses against the first battery cover 288a, a force is transmitted through the battery case 286, and the second battery cover 288b is deformed. The first battery cover 288a and the second battery cover 288b are thus held in place, and electrical connections within the self-contained battery unit 190 are maintained.

Although certain control devices, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A control device mountable to a handlebar of a bicycle, the control device comprising:
a housing;
a lever coupled to and pivotable relative to the housing;
a master cylinder portion supported by the housing, the master cylinder portion having a fluid cylinder, the fluid cylinder having a first end and a second end opposite the first end with a cylindrical wall therebetween, the fluid cylinder being hollow, such that an opening extends through the master cylinder portion, from the first end to the second end;
a bleed plug removably connected to the master cylinder portion via the opening at the first end of the fluid cylinder; and
a piston assembly supported by the housing, the piston assembly being movable relative to the master cylinder portion, at least part of the piston assembly being disposed within the master cylinder portion,
wherein the housing is made of a first material, and the master cylinder portion is made of a second material, the second material being different than the first material, wherein the central axis of the bleed plug is a first central axis,
and the master cylinder portion has a second central axis extending along a length of the master cylinder portion, the first central axis is in line with the second central axis.

2. The control device of claim 1, further comprising a pull rod,
wherein the lever is coupled to the piston assembly via the pull rod, such that rotation of the lever relative to the housing causes the piston assembly to translate relative to the master cylinder portion.

3. The control device of claim 2, wherein the first material is a glass filled polyamide or a carbon filled polyamide, and the second material is aluminum.

4. The control device of claim 1, wherein the bleed plug has the first central axis that extends along a length of the bleed plug, and
wherein the first central axis of the bleed plug extends through an opening through the master cylinder portion.

5. The control device of claim 1, wherein the piston assembly is biased against an inner surface of the fluid cylinder, such that the inner surface of the fluid cylinder acts as a stop and locates an initial position of the piston assembly relative to the master cylinder portion, the inner surface of the fluid cylinder being closer to the first end of the fluid cylinder than the second end of the fluid cylinder.

6. The control device of claim 5, wherein the cylindrical wall of the fluid cylinder has at least one inner annular surface and at least one outer annular surface,
wherein the cylindrical wall of the fluid cylinder includes a first opening extending from an inner annular surface of the at least one inner annular surface to an outer annular surface of the at least one outer annular surface of the cylindrical wall, through the cylindrical wall, and a second opening extending from the inner annular surface or another inner annular surface of the at least one inner annular surface to the outer annular surface or another outer annular surface of the at least one outer annular surface of the cylindrical wall, through the cylindrical wall, and
wherein the first opening is positioned at a distance along a length of the master cylinder portion relative to the second opening.

7. The control device of claim 6, wherein the first opening is a timing port, and the second opening is a compensation port.

8. The control device of claim 6, wherein the piston assembly includes:
a piston that is a hollow and has a first end, a second end opposite the first end, an inner annular surface, an outer annular surface, and a flange extending around and away from the outer annular surface;
a piston cap connected to the first end of the piston; and
a seal disposed around the piston and between the flange of the piston and the piston cap.

9. The control device of claim 8, wherein the seal is disposed adjacent to the first opening when the piston assembly is in the initial position relative to the master cylinder portion.

10. The control device of claim 9, wherein a fluid is disposable within a volume between the piston and the fluid cylinder,
wherein the piston assembly is configured to translate in a first direction relative to the master cylinder portion when the lever rotates in a first rotational direction relative to the housing, such that the seal moves towards a timing port and pushes a portion of the fluid out of the master cylinder portion for activation of a brake caliper of the bicycle.

11. The control device of claim 8, wherein the piston cap has a castled end.

12. The control device of claim 8, further comprising:
a fluid port supported by the housing; and
a fluid chamber within the housing,
wherein when the piston assembly is in the initial position relative to the master cylinder portion, the control device has a fluid path between the fluid port and the plug, via a volume between the master cylinder portion and the piston, the first opening through the cylindrical wall of the master cylinder portion, the fluid chamber, the second opening through the cylindrical wall of the master cylinder portion, and the piston cap.

13. A brake control device for a bicycle, the brake control device comprising:
a housing including a fluid chamber;
a lever coupled to and pivotable relative to the housing;
a master cylinder portion attached to the housing, the master cylinder portion having a fluid cylinder, the fluid cylinder having a first end and a second end opposite the first end; and
a plug removably connected to the first end of the fluid cylinder, the fluid cylinder being accessible from outside the housing when the plug is removed from the fluid cylinder,
wherein the brake control device has a fluid path between the first end of the fluid cylinder and the second end of the fluid cylinder, via the fluid chamber of the housing,
wherein the fluid cylinder has an opening extending radially through a portion of the fluid cylinder, and
wherein the fluid path between the first end of the fluid cylinder and the second end of the fluid cylinder includes a fluid path between the fluid chamber and the second end of the fluid cylinder via the opening through the portion of the fluid cylinder.

14. The brake control device of claim 13, wherein the portion of the fluid cylinder is a first portion of the fluid cylinder, and the opening is a first opening,
wherein the fluid cylinder has a second opening extending radially through a second portion of the fluid cylinder,
wherein the first opening is positioned at a distance along a length of the fluid cylinder relative to the second opening, and
wherein the fluid path between the first end of the fluid cylinder and the second end of the fluid cylinder includes a fluid path between the first end of the fluid cylinder and the fluid chamber via the second opening through the second portion of the fluid cylinder.

* * * * *